US012764234B2

(12) United States Patent
Thomas et al.

(10) Patent No.: US 12,764,234 B2
(45) Date of Patent: Oct. 13, 2026

(54) METHOD FOR JITTER COMPENSATION DURING RECEIPT OF VOICE CONTENT OVER IP-BASED NETWORKS AND RECEIVER FOR THAT AND METHOD AND DEVICE FOR SENDING AND RECEIVING VOICE CONTENT WITH JITTER COMPENSATION

(71) Applicant: DFS DEUTSCHE FLUGSICHERUNG GMBH, Langen (DE)

(72) Inventors: Rainer Thomas, Rödermark (DE); Andreas Potyka, Hösbach (DE)

(73) Assignee: DFS DEUTSCHE FLUGSICHERUNG GMBH, Langen (DE)

( * ) Notice: Subject to any disclaimer, the term of this patent is extended or adjusted under 35 U.S.C. 154(b) by 228 days.

(21) Appl. No.: 18/571,224

(22) PCT Filed: Jul. 8, 2022

(86) PCT No.: PCT/EP2022/069098
§ 371 (c)(1),
(2) Date: Dec. 16, 2023

(87) PCT Pub. No.: WO2023/281068
PCT Pub. Date: Jan. 12, 2023

(65) Prior Publication Data
US 2024/0314244 A1 Sep. 19, 2024

(30) Foreign Application Priority Data
Jul. 9, 2021 (DE) ..................... 10 2021 117 762.6

(51) Int. Cl.
*H04L 49/9023* (2022.01)
*H04L 65/80* (2022.01)
*H04M 7/00* (2006.01)

(52) U.S. Cl.
CPC ...... *H04M 7/0084* (2013.01); *H04L 49/9023* (2022.05); *H04L 65/80* (2013.01)

(58) Field of Classification Search
CPC ............................ H04L 49/9023; H04L 65/80
(Continued)

(56) References Cited

U.S. PATENT DOCUMENTS

2004/0076190 A1 4/2004 Goel et al.
2009/0016333 A1 1/2009 Wang et al.
(Continued)

FOREIGN PATENT DOCUMENTS

CN 110809097 A * 2/2020 ......... H04L 41/0663
EP 2189978 A 5/2010
(Continued)

OTHER PUBLICATIONS

Qiao, Z., Venkatasubramanian, R.K., Sun, L. et al. "A New Buffer Algorithm for Speech Quality Improvement in VoIP Systems". Wireless Pers Commun 45, 189-207 (2008). https://doi.org/10.1007/s11277-007-9408-7.
(Continued)

*Primary Examiner* — Ahmad F. Matar
*Assistant Examiner* — Jirapon Tulop
(74) *Attorney, Agent, or Firm* — The Roy Gross Law Firm, LLC; Roy D. Gross

(57) ABSTRACT

A jitter compensation during receipt of voice content (1, 2, 3, 4) via IP-based networks in voice packets (110, 120; 210) with a header (H) and payload (PL) is described, wherein a piece of time information of a transmitter time of a transmitter, which indicates the time of sending (ts) of the voice
(Continued)

packet (110, 120; 210), is contained in the voice packet (110, 120; 210). It is provided that the receiver initializes a receiver clock using a transmitter time by means of the time information in the initial packet, that the receiver determines a minimum relative packet transmission duration (delta) after the initialization of the receiver clock, adjusts the receiver time as a function of the minimum relative packet transmission duration (delta), during the receipt of a first voice packet (111) with voice content, determines the actual time of receipt of this voice packet and determines the buffer (DJB) as a function of the actual time of receipt (FIG. 4).

15 Claims, 8 Drawing Sheets

(58) Field of Classification Search
USPC .......................................................... 370/259
See application file for complete search history.

(56) References Cited

U.S. PATENT DOCUMENTS

| | | | |
|---|---|---|---|
| 2010/0290454 | A1 | 11/2010 | Lundberg |
| 2012/0300769 | A1 | 11/2012 | Narbutt |
| 2018/0295050 | A1 | 10/2018 | Lee et al. |

FOREIGN PATENT DOCUMENTS

| | | | | | |
|---|---|---|---|---|---|
| EP | 3328010 | A1 | | 5/2018 | |
| EP | 4367813 | B1 | * | 11/2025 | ............ H04L 65/80 |
| JP | 2001352316 | A | | 12/2001 | |
| KR | 20050084156 | A | | 8/2005 | |
| WO | 2004/054157 | A2 | | 6/2004 | |
| WO | 2009070093 | A1 | | 6/2009 | |
| WO | 2015126301 | A1 | | 8/2015 | |

OTHER PUBLICATIONS

W. Montgomery, "Techniques for Packet Voice Synchronization," in IEEE Journal on Selected Areas in Communications, vol. 1, No. 6, pp. 1022-1028, Dec. 1983, doi: 10.1109/JSAC.1983.1146024.
The European Organisation For Civil Aviation Equipment, "Interoperability Standards for VoIP ATM Components Part 1: Radio", Apr. 23, 2009 (Apr. 23, 2009), p. 1-76, Retrieved from the Internet: URL:http://startrinity.com/voip/Resources/ED-137_Interoperability_Standards_for_VoIP_ATM_Components_Part_1_Radio.pdf.
Schulzrinne, H. et al. (2003). "RTP: A Transport Protocol for Real-Time Applications". Network Working Group, RFC3550. TXT, Internet Engineering Task Force, IETF; Standard, Internet Society (ISOC) 4, Rue Des Falaises CH-1205 Gen Eva, Switzerland, Jul. 1, 2003 (Jul. 1, 2003).
PCT International Search Report for International Application No. PCT/EP2022/069098, mailed Oct. 27, 2022, 4pp.
PCT Written Opinion for International Application No. PCT/EP2022/069098, mailed Oct. 27, 2022, 8pp.

* cited by examiner

| $T_{SINK}$ ( receiver time ) | $T_{RTP}$ ( transmitter time ) | Packet No. | $RTP_{PL}$ ( size payload ) | delta |
|---|---|---|---|---|
| te=521307 | ts=521224 | seqNr=00190 | PLsize=80 | delta=-3 |
| te=521387 | ts=521304 | seqNr=00191 | PLsize=80 | delta=-3 |
| te=521467 | ts=521384 | seqNr=00192 | PLsize=80 | delta=-3 |
| te=521543 | ts=521464 | seqNr=00193 | PLsize=80 | delta= 1 |
| te=521626 | ts=521544 | seqNr=00194 | PLsize=80 | delta=-2 |
| te=521706 | ts=521624 | seqNr=00195 | PLsize=80 | delta=-2 |
| te=521786 | ts=521704 | seqNr=00196 | PLsize=80 | delta=-2 |
| te=521868 | ts=521784 | seqNr=00197 | PLsize=80 | delta=-4 |
| te=521946 | ts=521864 | seqNr=00198 | PLsize=80 | delta=-2 |
| te=522026 | ts=521944 | seqNr=00199 | PLsize=80 | delta=-2 |
| end of measurment interval: TSINK=522026; TMIN=1; new value for TSINK=522027 | | | | |
| te=522107 | ts=522024 | seqNr=00200 | PLsize=80 | delta=-3 |
| te=522187 | ts=522104 | seqNr=00201 | PLsize=80 | delta=-3 |
| te=522267 | ts=522184 | seqNr=00202 | PLsize=80 | delta=-3 |
| te=522268 | ts=522264 | seqNr=00203 | PLsize=0 | delta=-4 |
| te=522348 | ts=522344 | seqNr=00204 | PLsize=0 | delta=-4 |
| te=522429 | ts=522424 | seqNr=00205 | PLsize=0 | delta=-5 |
| te=522508 | ts=522504 | seqNr=00206 | PLsize=0 | delta=-4 |
| te=522590 | ts=522584 | seqNr=00207 | PLsize=0 | delta=-6 |
| te=522667 | ts=522664 | seqNr=00208 | PLsize=0 | delta=-3 |
| te=522747 | ts=522744 | seqNr=00209 | PLsize=0 | delta=-3 |
| end of measurment interval: TSINK=522747; TMIN=-3; new value for TSINK=522746 | | | | |

Fig.8

| $T_{SENKE}$ ( receiver time ) | $T_{RTP}$ ( transmitter time ) | Packet No. | $RTP_{PL}$ ( size payload ) | $PTT_{type}$ | delta |
|---|---|---|---|---|---|
| te=534778 | ts=534770 | seqNr=00313 | PLsize=00 | off=0 | delta=-8 |
| te=534936 | ts=534930 | seqNr=00314 | PLsize=00 | off=0 | delta=-6 |
| te=535122 | ts=535035 | seqNr=00315 | PLsize=80 | on=1 | delta=-7 |
| PTT ON (start data trasnfer); buffer = 153 | | | | | |
| te=535204 | ts=535115 | seqNr=00316 | PLsize=80 | on=1 | delta=-9 |
| te=535282 | ts=535195 | seqNr=00317 | PLsize=80 | on=1 | delta=-7 |

Fig.10

METHOD FOR JITTER COMPENSATION DURING RECEIPT OF VOICE CONTENT OVER IP-BASED NETWORKS AND RECEIVER FOR THAT AND METHOD AND DEVICE FOR SENDING AND RECEIVING VOICE CONTENT WITH JITTER COMPENSATION

CROSS REFERENCE TO RELATED APPLICATIONS

This application is a National Phase of PCT Patent Application No. PCT/EP2022/069098 having International filing date of Jul. 8, 2022, which claims the benefit of priority of German Patent Application No. 10 2021 117 762.6, filed Jul. 9, 2021, the contents of which are all incorporated herein by reference in their entirety.

This relates to a method for jitter compensation of random temporal fluctuations, which are termed jitter, between the times of receipt of voice packets when receiving voice content via IP-based networks, that is to say in particular for use in a method (such as in the case of telephone or radio connections) for transmitting voice content (which is digitized as voice data in the case of analogue voice content) in digital voice packets (also termed Voice over IP or VoIP), and a receiver set up to carry out the method. In addition, the invention relates to a method and a device for sending and receiving voice content, in which the described jitter compensation is used.

In the method, as is customary in the case of VoIP, a sequence of digitized voice packets with or without voice content is received by a receiver for processing voice content contained in the voice packets, in particular for output, sending out via a radio link or other use of the voice data. A digital voice packet with voice content has a section termed the header with data for communication control (for example, corresponding to a communication protocol or communication standard) and a section termed the payload. The payload of a voice packet consists of a part of the (whole) voice content in the form of digitized voice data. Accordingly, the transmission of the (whole) voice content is divided into a sequence of voice packets with consecutive digital voice data (payload PL), i.e. the digital voice data contained (directly or indirectly) in consecutive voice packets represent the (whole) voice content when joined together.

A voice packet without voice content has the header without the payload, therefore it is usually correspondingly shorter. However, it may also be the case that a voice packet without voice data also has a payload with zero data and is then just as long as a voice packet with data content (voice data). Zero data are data with arbitrary or random content, i.e. are not correlated with useful voice content.

As the payload does not contain any information in this case, such a voice packet is also referred to as a voice packet without a payload in the context of the application. In principle, however, it is advantageous if voice packets without voice content are shorter and the payload section is simply dispensed with instead of filling it with zero data. Depending on the communication standard, however, it may also be required that all voice packets, with or without voice data, must be the same length. Voice packets without voice content are used, for example, to maintain an existing communication connection between the transmitter and receiver long-term, so that the communication connection can be monitored. One example of such a use of Voice over IP may be the transmission of operational ground-to-air communication in air traffic (in sections via a radio connection). This represents a particularly preferred application of the invention.

Each voice packet contains, particularly in the header of the voice packet, at least one piece of time information of a transmitter time of a transmitter, which indicates the time of sending of the voice packet. This is true for voice packets with and without voice content.

After receiving a first voice packet with voice content, the receiver waits to process the voice content for a wait time termed a buffer (jitter buffer) in the sense of a buffer time. This allows the receiver to receive subsequent voice packets with voice content during the buffer (i.e. during the wait time) in order to compensate the jitter between the receipt of subsequent voice packets and achieve continuous processing of the voice content without interrupting the voice output owing to a delay to receipt due to jitter. The processing may be the direct playback of the voice content as audible speech (i.e. analogue output). The receiver may however also broadcast the received voice content via a radio transmitter. Playback of the voice content then only takes place in the radio receiver. In this case, the receiver only plays back the digital voice packets indirectly, in that the received voice packets are processed and the voice content contained is sent out as a radio message by the radio transmitter. In this case, the generated voice content (radio message), of air traffic control (as transmitter) for example, is transmitted to a radio transmitter (as receiver) of a ground station as voice over IP communication via an IP-based network. The radio transmitter then sends out the radio message that is output by the radio receiver (for communication from air traffic control, for example, to an aircraft). In the event of communication in the reverse direction (e.g. from an aircraft to air traffic control), the radio transmitter is located in the aircraft and the radio receiver is located in the ground station. The radio receiver is then accordingly the transmitter of the voice over IP communication. The terms transmitter and receiver in this text refer to the transmission of the voice content via the IP-based network.

The physical transmission process for voice packets is briefly explained below to explain the background of voice over IP communication. A more detailed explanation takes place in the context of the of the description of an exemplary embodiment.

The total delay of a voice packet (packet transmission duration) begins with the time of sending out by the transmitter and results from the sum of the delay of the voice packets via the transmission channel (also termed delay), to which the length of the voice packet itself also belongs, and the jitter (in the sense of random fluctuations of the times of receipt). Further wait times, such as the buffer (jitter buffer), result until the processing (e.g. output or other processing) of the voice content contained in the voice packet.

The time from sending out the voice packet to processing the voice content is therefore given by the actual packet transmission duration (delay and jitter) and the buffer (as well as further added wait times, if appropriate, after the receipt of the voice packet until the output of the voice content).

The longer the wait time is, the more of the subsequent voice packets can be received and temporarily stored (buffered), so that after processing the voice content of the preceding voice packet, the voice content of subsequent voice packets is already available for further processing and continuous processing, e.g. voice playback, is ensured, even if the jitter of a subsequent voice packet is particularly long, because the voice content of the buffered voice packets is additionally processed initially. A long buffer in terms of time leads to a correspondingly long delay, which is undesirable for voice over IP applications with high requirements for real-time communication. Accordingly, a short buffer in terms of time leads to a higher communication speed, but also a higher risk of voice packet losses, which can interrupt the continuous processing of the voice content.

Another disadvantage of this well-known solution with a buffer is that the total time made up of packet transmission duration and, if necessary, also added wait times (such as buffers) still depends on the random duration of the jitter during the transmission of the voice packet and therefore cannot be predicted exactly. This may lead to disadvantages in the case of certain communication applications, e.g. in radio applications with multiple parallel transmission channels (e.g. parallel sending out of the radio message by means of several radio transmitters of various ground stations), in which jitter of different lengths on the various transmission channels leads to an echo.

Therefore, the object of the invention is to propose jitter compensation and voice transmission using such jitter compensation, which, whilst ensuring continuous processing, e.g. radio sending or output, of the voice content, enables a defined duration of the total time in the case of the transmission of voice packets (at least within a predetermined time period) from the output of the voice packet by the transmitter to the processing of the voice information by the transmitter.

This object is achieved according to the invention with the features of claims 1, 9, 11 and 15.

In the context of the jitter compensation proposed according to the invention, it is provided in particular that after receiving a first voice packet (with or without voice content or voice data), termed an initial packet—during a connection period in a transmission channel, which is set up to a transmitter of the voice packet or exists between the receiver and the transmitter—the receiver initializes a receiver clock with a transmitter time by means of the time information in the initial packet, so that the receiver time correlates with the transmitter time when sending out the voice packet. As a result, the receiver clock displays a time which depends on the time of sending of the first voice packet from the connection period, the delay of the voice packet via the transmission channel and the temporally random jitter. According to an embodiment of the invention, it is simple to synchronize the receiver time with the time information from the voice packet, wherein the time information is corrected by the sample time of the payload of the packet, if applicable, so that the receiver time corresponds to the transmitter time for a voice packet without data content and the random jitter of the currently transmitted voice packet. There is therefore a time offset—with respect to an absolute time, which is constant in the whole system—between the transmitter time and the receiver time, which time offset corresponds exactly to the packet transmission time of the first voice packet (without voice content) in the connection period.

A connection period (also termed a session) can begin with the set-up of a transmission channel between the transmitter and receiver, and end with the interruption of the transmission channel, i.e. correspond to the actual connection duration. However, it is also possible to choose a shorter connection period within the actual connection duration, e.g. by specifying a fixed time duration and/or depending on events in the receiver and/or transmitter. A connection period therefore corresponds to a defined or definable time period during the physical connection duration in the transmission channel, i.e. a part of the entire connection duration, but at most the entire connection duration.

For subsequent voice packets, which are received in the receiver with exactly the same jitter (assuming a constant delay), the receiver time correlates with the transmitter time of the transmitter which sends out the packets. In the previously described types of correlation, the transmitter time and the receiver time are therefore identical if jitter is the same. Deviations in the correlation are caused by different jitter.

This allows the receiver to determine a minimum relative packet transmission duration after the receiver clock has been initialized, in that during the receipt of subsequent voice packets in each case

- the receiver time is compared with the time information, which is contained in the header of the subsequent voice packet, at the transmitter time when the voice packet was sent out and a relative packet transmission duration is determined relatively to the receiver time. This can be done, for example, by a difference of transmitter time and receiver time for previous differences. If the receiver time and the transmitter time are synchronized as described in the previous embodiment, a difference “receiver time minus transmitter time” of zero means that the subsequently transmitted voice packet was just as fast as the voice packet, on the basis of which the receiver time was determined, during initialization or subsequent adjustment (described further below). If the difference is less than zero, the receiver time is earlier than the transmitter time; the voice packet was faster than the voice packet, on the basis of which the receiver time was determined (relatively shorter packet transmission duration). By contrast, if the difference is greater than zero, the receiver time is later than the transmitter time; the voice packet was slower than the voice packet, on the basis of which the receiver time was determined (relatively longer packet transmission duration).
- a resultant minimum relative packet transmission duration within the connection period or an interval within the connection period is stored temporarily. Within the connection period (or an interval within the connection period which is used as a basis for checking), the relative packet transmission duration is then stored anew as the minimum relative packet transmission duration if the current determined relative packet transmission duration is shorter than the hitherto minimum (and temporarily stored) relative packet transmission duration.
- the receiver time dependent on the minimum relative packet transmission duration, which was stored temporarily at a defined evaluation time (e.g. at the end of an interval within the connection period), is adjusted in such a manner that the receiver time correlates with the transmitter time when sending out the voice packet with the minimum relative packet transmission duration (in particular is synchronized with the same). In an embodiment, this may take place in that the value of the minimum relative packet transmission duration stored at the evaluation time is subtracted from the current receiver time, in order to determine a new receiver time for the remainder of the method. As a result, time differences between the receiver clock and the transmitter clock, e.g. owing to clock differences of the timers used, are also automatically corrected continuously.

The actual embodiments specified in the preceding general description are used for explanation. The invention is not necessarily limited to these embodiments.

Whenever a voice packet with voice content (or a sequence of voice packets with voice content) is received after at least one received voice packet without voice content, the receiver assumes that new voice content (e.g. a new radio message within the connection period) should be transmitted. The start and end of new voice content can also (additionally or alternatively) be identified by means of coding in the header.

Accordingly, when receiving a first voice packet with voice content after at least one voice packet without voice content, the receiver determines the actual time of receipt of this voice packet by comparing the time information in the received voice packet with the receiver time at receipt, so that the actual time of receipt is indicated in particular relatively to the receiver time. This actual time of receipt therefore indicates the actual jitter when the first voice packet with voice content is received. The receiver then determines the buffer, i.e. the buffer time or the wait time until the voice content is processed, as a function of/dependent on the actual time of receipt, i.e. as a function of the actual jitter when the first voice packet with voice content is received. In principle, the buffer can be formed by subtracting the actual jitter from a predefined maximum buffer to be used when a voice packet with no or minimum jitter is received as the first voice packet with data content. If the actual jitter corresponds to the minimum or no jitter, the predefined maximum buffer is used as the buffer.

A preferred embodiment according to the invention for determining the buffer consists in forming the difference of the time information in the voice packet and the actual time of receipt. This difference then indicates the jitter of the current voice packet, which determines the buffer according to the invention as the first voice packet with voice content. If this difference, "time information in voice packet minus actual time of receipt" is less than zero, the (positive) value of the difference indicates the actual jitter. This actual jitter is then subtracted from the predefined maximum buffer. Otherwise, if the difference "time information in voice packet minus actual time of receipt" is greater than or equal to zero, the maximum buffer is used as buffer. This simple embodiment applies if the receiver time is equal to the time information (time of sending) in the voice packet without voice content with the shortest packet transmission time in the connection period. For a voice packet with voice content with the shortest packet transmission time in the connection period, the temporal length of the payload is correspondingly used as a correction, in order to have the same standardization. If the transmitter time and the receiver time correlate according to a different dependency (i.e. if these were not synchronized for the voice packet with the smallest packet transmission time), the dependency according to this correlation is used accordingly.

According to the invention, a dynamic buffer (jitter buffer) is therefore determined by means of the jitter compensation, the temporal length of which is defined as a function of the length of the actual jitter of the voice packet, after the receipt of which the buffer is determined. This is the first voice packet with voice content after at least one voice packet without voice content. The buffer is preferably determined according to the invention in such a manner that a maximum buffer is used for a voice packet with a packet transmission time without actual jitter or with minimal actual jitter (that is to say a voice packet with the earliest possible time of receipt) and an actual jitter is subtracted from this maximum buffer. In other words, the buffer is therefore determined according to the invention such that the sum of the actual jitter (of the voice packet which is used to determine the dynamic buffer) and the dynamic buffer is constant. The length is preferably selected such that this constant value of the sum ensures continuous processing (e.g. audio playback and/or radio sending), even if consecutive voice packets with maximally different jitter are received. This constant value of the sum of actual jitter and dynamic buffer should therefore at least be greater than the maximum difference that occurs in the times of receipt of voice packets. Smaller temporary interferences may also be captured by means of a further safety range, e.g. the double of an expected jitter.

As a result, not only is a shortest possible time achieved between sending out a voice packet with voice content and processing the voice content (e.g. continuous output of a sequence of voice packets with contiguous voice content), but also, the time between sending out the voice packet with voice content and the processing thereof is always the same length, even if various transmission channels are used in parallel or the absolute transmission time must be known for other reasons.

A further preferred embodiment of the invention may provide that during the initialization of the receiver clock and during the determination of the relative packet transmission duration, a different length of voice packets with voice content and voice packets without voice content is taken into account, particularly in that the time of receipt is standardized to the transmission of a voice packet without voice content, wherein the additional and known length of the payload of the data telegram can be subtracted when processing the time of receipt, for example. As a result, an effective transmission duration (packet transmission time) can be calculated, in each case with respect to the shorter voice packets without data content. According to the invention, in accordance with a particularly preferred embodiment, the receiver clock can be synchronized during initialization with the time information in a voice packet, standardized to a voice packet without voice content. For the voice packet with the shortest packet transmission time (i.e. without jitter or with the shortest jitter that occurs), this therefore corresponds in fact to the delay of the voice packet on the transmission channel. The deviation, e.g. the difference, between the time information in the voice packet and the receiver time therefore indicates the current jitter when receiving the voice packet currently being considered. Handling is facilitated thereby and the method can be used without differences on voice packets with and without voice data, e.g. to initialize and/or adjust the receiver time.

According to a further aspect according to the invention, the determination of the minimum packet transmission duration, the result of which, according to the invention, is the adjustment of the receiver time to the temporarily stored minimum packet transmission duration, can take place at multiple intervals during the connection duration or the connection period, which intervals preferably follow one another directly. As a result, the receiver time is continuously adjusted to possible changes in the transmission channel, even during a connection duration. This preferably takes place at the end of an interval in each case. An ongoing output of analogue voice content corresponding to consecutive received voice packets with voice content is preferably not affected by an adjustment of the receiver time and is continued. The adjustment of the receiver time only affects the determination of the buffer (which is dynamic according to the invention), if a first voice packet with voice content is received again (after the receiver time had been adjusted) after at least one voice received packet without voice content.

The length of the intervals can be defined by a temporal length (duration) or a specified number of received voice packets, with and/or without voice content.

It may also be provided according to the invention for the connection period of the receiver to the transmitter, or more generally between the transmitter and the receiver, to be limited to a maximum connection duration. The transmitter and/or receiver may be set up to interrupt the connection after the maximum connection time has been reached, with the consequence that the connection must be set up anew, at least if voice content should be transmitted again. This leads to a re-initialization of the receiver clock and a repeat of the above-described method. Thus, changes in the transmission conditions in the transmission channel can be taken into account automatically.

In a further actual embodiment of the invention, the adjustment of the receiver time as a function of the temporarily stored minimum relative packet transmission duration can take place in such a manner that the receiver time is advanced by the minimum relative packet transmission duration, if this indicates—with respect to the current receiver time—that a voice packet with a shorter packet transmission duration was received. By advancing the receiver clock, the same is synchronized to the time of transmission of the voice packet with the shortest jitter or the shortest packet transmission duration.

Furthermore, it may be provided according to the invention that the adjustment of the receiver time as a function of the temporarily stored minimum relative packet transmission duration can take place in such a manner that the receiver time is set back if the temporarily stored minimum relative packet transmission duration indicates that only voice packets with a longer packet transmission time with respect to the current receiver time were received, wherein the receiver time is set back by a defined or definable duration. Setting back the receiver time takes account of a longer packet transmission duration for all voice packets and corrects the use of an unrealistically short jitter, if—during the period under consideration, in particular the interval within the connection period—in the event of no receipt, the hitherto shortest packet transmission duration (i.e. the small or shortest value of the jitter) during the preceding receipt had been reached again. This May indicate that transmission conditions are changing. According to a particularly preferred embodiment of the invention, a definable period of time may be realized by the minimum relative packet transmission duration with respect to the receiver time, particularly as a temporal deviation from the receiver time when receiving the voice packet, weighted with a weighting factor. A sensible weighting factor may for example be ⅓, without this embodiment according to the invention being limited to that. As a result, time differences between the receiver clock and the transmitter clock, e.g. owing to clock differences of the timers used, are also automatically corrected continuously.

As indicated previously, in a particularly preferred embodiment of the invention, the determination of the minimum relative packet transmission duration for voice packets without voice content and voice packets with voice content can take place in the same way, even during the output or processing of voice content, i.e. independently thereof. In this case, the previously explained standardization to voice packets without voice content can be undertaken. Alternatively, a standardization to voice packets with voice content would also be possible. This allows the minimum relative packet transmission duration to be determined continuously during the connection period.

According to the invention, the buffer may, in accordance with a preferred embodiment of the invention, start from a maximum buffer, which adjusts a maximum jitter to be taken into account on the basis of a delay to receipt resulting from the comparison of the time information in the first voice packet with voice content and the receiver time when this first voice packet is received (i.e. on the basis of the actual jitter). The maximum jitter to be considered is to be understood as a maximum delay to receipt due to the random fluctuations of the times of receipt of the voice packets in the receiver. Accordingly, it may be provided that the adjustment of the maximum buffer takes place by shortening this maximum buffer by the actual jitter. If a negative delay to receipt results, i.e. the received first voice packet with voice content was faster than the voice packets previously used to adjust the receiver time (including the initial packet), it is also possible according to the invention to dispense with an adjustment of the maximum buffer.

According to a preferred embodiment of the invention, the or a voice packet with identical voice content may be received by the receiver via several different transmission channels, wherein a correction of the delay of the voice packets with identical voice content via the various transmission channels can be applied by the receiver. This can for example take place such that the delays of the voice packets are compared with one another by means of a delay correction for the various transmission channels, in that the delay correction for each transmission channel is formed by the difference of the delay from the transmission channel with the longest transmission time. This delay correction is also termed Dynamic Delay Compensation (DDC). The delay correction may already be known for each transmission channel and can be derived, for example, from the physical conditions of the transmission channel. The person skilled in the art knows the physical laws relating to this, as well as the basic procedure for such a delay correction (Dynamic Delay Compensation DDC).

In addition to the buffer (jitter buffer), a delay correction of this type also represents a further wait time between receiving a voice packet and processing the voice content from the voice packet. If such a delay correction is known or can be determined already by the transmitter, this delay correction may also be transmitted in the voice packet, e.g. in the header of the voice packet. As a result, particularly in connection with the jitter compensation proposed according to the invention, it is achieved that the time from sending out the voice packet with identical voice content on the various transmission channels and processing of the voice content by the receiver (sending out by radio and/or output) is the same, even in the case of different delays of these voice packets with identical voice content in the various transmission channels (through the IP-based network). This avoids an echo, for example in radio communication in the context of a particularly preferred use of a voice over IP transmission for operational ground-to-air communication in air traffic, in which several receivers (of the voice over IP communication) send out the voice information simultaneously as radio transmitters at different ground stations (arranged in a spatially distributed manner). This means that a large airspace can be covered even in the case of a limited radio range.

According to the invention, such a delay correction can also be determined by the receiver according to the invention by applying the method for jitter compensation, in that a receiver clock is initialized in the above-described manner for each transmission channel separately during a connection period and, after the initialization of the receiver clock, a minimum relative packet transmission duration is determined in each transmission channel in the described manner, which is completed with the above-described adjustment of the receiver clock. Since the voice packets with the identical voice content were respectively transmitted on the various transmission channels and the receiver clocks respectively correlate with the transmitter time when sending out the voice packet with the minimum relative packet transmission duration on the respective transmission channel, the delay differences on various transmission channels can be derived for the various transmission channels from a comparison of the receiver times, which are in each case correlated with packet transmission durations with minimal jitter, and a corresponding correction of the delay (Dynamic Delay Compensation DDC) can be derived for each transmission channel.

According to a preferred embodiment, this can be done, for example, by each receiver of one of the several transmission channels sending its receiver time back to the transmitter (round trip delay) after receiving a voice packet (with an identifier of that voice packet and of the receiver). Thus, the transmitter can (analogously to the previously described method) determine the minimum packet transmission duration between transmitter and the respective receiver. From this, the transmitter can determine a respective correction of the delay (Dynamic Delay Compensation DDC) for each receiver and, if necessary, transmit the same to this receiver or else include the same in the time information for the transmitter time contained in the header of each voice packet. An automatic dynamic delay compensation DDC can thereby be carried out accordingly.

The invention also relates to a receiver for receiving digitized voice packets via IP-based networks and for processing analogue voice content contained in the voice packets according to claim 9, having a receiving unit, which can be connected (is adapted to connected) to the IP-based network and is set up (adapted) for receiving voice packets transmitted via the IP-based network, having an arithmetic logic unit with receiver clock, which is set up to process the received voice packets, for example in that the payload with digital voice data transmitted in the voice packets is extracted from the voice packets and processed further. Further processing may for example consist in converting the voice data extracted from the sequence of voice packets into the voice content and sending out the same by radio (for example by means of digital HF modulation by a modulator) and/or outputting the same directly by means of a voice output unit, particularly a loudspeaker. According to the invention, the arithmetic logic unit is set up (adapted) to execute the previously described method for jitter compensation or parts thereof, according to one of claims 1 to 8, when receiving and outputting the voice content.

According to a preferred embodiment, the receiver can be set up to receive the voice packet with the identical voice content via several different transmission channels and to apply the method according to claim 8 in the process, wherein the arithmetic logic unit is set up to process the voice content from the received voice packets with the identical voice content from several various transmission channels. In particular, the identical voice content can respectively be output (e.g. transmitted by radio) from the plurality (or even all) of the voice packets transmitted via the various transmission channels. By means of the method according to the invention, the time of output for the voice packets with the identical voice content is synchronized over the various transmission channels, both with regards to the correction of the delay of the voice packets via the various transmission channels (Dynamic Delay Compensation (DDC)) and with regards to the correction of the random temporal fluctuations between the times of receipt (jitter). For the preferred use case of ground-to-air communication, the receiver may in particular comprise several radio transmitters in different spatially separated ground stations, which send out the same voice information by radio in a time-synchronised manner by means of the described method.

The invention also relates to a method for sending and receiving voice content according to the features of claim 11, in which a transmitter converts voice content into a sequence of digital or digitized voice packets with or without voice content, wherein a voice packet with voice content has a section, termed the header, with data for communication control and a section, termed the payload, with voice data digitized from part of the voice content. A voice packet without voice content has the header without the payload. Each voice packet, particularly the header of the voice packet, contains at least one piece of time information of a transmitter time, which indicates the time of sending of the voice packet. The transmitter sends out the sequence of voice packets via at least one transmission channel of an IP-based network. In the method, a receiver receives the sequence of digitized voice packets with or without voice content and processes the voice content, wherein the previously described method for jitter compensation, particularly according to one of claims 1 to 8, is applied in the receiver.

According to a preferred embodiment of the method, a permanent communication connection can be set up in the IP-based network for a connection period between the transmitter and the receiver via at least one communication channel, wherein, during the connection period, at times when no voice content should be transmitted, voice packets without voice content are exchanged, preferably at a specified regular transmission clock rate, to maintain the connection between the transmitter and receiver, and wherein, at times during the connection period when voice content should be transmitted, the sequence of digital or digitized voice packets with the voice content is transmitted from the transmitter to the receiver.

As a result, the method for jitter compensation proposed according to the invention can be carried out long-term (continuously), so that the dynamically adjusted buffer is available at any time in accordance with the current conditions in the transmission channel, when voice content is transmitted.

According to the invention, in the case of a bidirectional voice connection, in which both communication partners function as transmitter and receiver, combined transmitter/receiver devices can also be used, in which the functions of transmitter and receiver are realized in one device in each case. In this sense, the functions described here separately for the transmitter and the receiver for the sake of clarity also apply respectively for combined transmitter/receiver devices. In these devices, if appropriate, certain functions are not assigned to the transmitter or the receiver uniquely. The invention also relates to such an embodiment in which all the described features are assigned to a combined transmitter-receiver devices, without clearly assigning the functions and features, some of which also overlap, to the transmitter or the receiver. This is true for example for the set-up of a permanent communication connection, which in principle can be initiated both by a transmitter and a receiver. In the context of a communication set-up, (pure)

receivers of voice content may also have transmitting functions for the communication set-up and (pure) transmitters of voice content may also have receiving functions for the communication set-up, in particular as provided in common communication technology for IP-based networks. In the case of combined transmitter/receiver devices, both communication participants may operate both as receiver and as transmitter, and exchange voice packets without voice content in both communication directions, to maintain the communication connection for example. This can be done in a common transmission channel for both communication directions or in one transmission channel for each of the communication directions, respectively. The same applies if there are several different transmission channels for one communication direction.

Insofar as it is used for implementing the invention, the communication technology known to the person skilled in the art also belongs to the subject matter of the invention, even if it is not described in full here, because this expert knowledge can be assumed.

According to an embodiment of the invention, it can be provided that the transmitter sends out a voice packet via several different transmission channels and the receiver receives the voice packets sent out via various transmission channels. Preferably, it can be provided that the receiver receives the voice channels transmitted via the various transmission channel and processes them simultaneously, whereby, for example, an echo in the output can be avoided due to the proposed invention. The receiver may comprise several spatially distributed radio transmitters that simultaneously send out the voice message by radio.

Accordingly, the method can particularly preferably be used according to the invention in radio communication, particularly for the transmission of operational ground-to-air communication in CLIMAX operation, in which several different radio channels (as or in the sense of transmission channels) are used for transmitting a radio message (as voice content).

To this end, the invention also relates to a device for sending and receiving digital or digitized voice packets via IP-based networks with voice content contained in the voice packets, having a transmitter and a receiver, wherein the transmitter has a voice recording unit, particularly a microphone, for recording the analogue voice content, and an arithmetic logic unit with transmitter clock, which is set up (adapted) for processing the recorded voice content according to the previously described method or a part thereof, particularly according to one of claims 11 to 14, and wherein the receiver is constructed according to the features as described previously, particularly according to one of claim 9 or 10, so that transmitter and receiver are set up (adapted) as a whole to apply the features of the method for sending and receiving voice content or parts thereof, particularly according to one of claims 11 to 14.

Further advantages, features and possibilities for use of the invention also result from the following description of exemplary embodiments and the drawing. All described and/or pictorially illustrated features belong, together or in any sensible combination for the person skilled in the art, to the subject matter of the invention, even independently of their summarization in the described or illustrated exemplary embodiments or in the claims.

In the figures:

FIG. 1 schematically shows the temporal sequence for the transmission of analogue voice content via an IP-based network (voice over IP-VoIP);

FIG. 2 schematically shows the temporal sequence for sending out voice packets with identical voice content on two different transmission channels without delay correction;

FIG. 3 schematically shows the temporal sequence for sending out voice packets with identical voice content on two different transmission channels corresponding to FIG. 2, extended by a delay correction;

FIG. 4 schematically shows the temporal sequence for sending out voice packets with identical voice content on two different transmission channels corresponding to FIG. 3 with a dynamic jitter compensation according to the invention;

FIG. 5 schematically shows the temporal sequence for sending out voice packets with identical voice content on two different transmission channels corresponding to FIG. 4 with a dynamic jitter compensation according to the invention, wherein several different voice contents are transmitted consecutively in various voice packet sequences;

FIG. 6 schematically shows a connection period between transmitter and receiver with the voice packets with and without voice information, which are received by the receiver;

FIG. 8 shows an extract of a log file for the execution of a method according to FIG. 8;

FIG. 10 shows an extract of a log file for the execution of a method according to FIG. 9;

Before describing actual embodiments of the invention, the principles of known voice transmission via IP-based networks (voice over IP or VoIP applications) and the terms used in this text should be explained.

Figure 1:
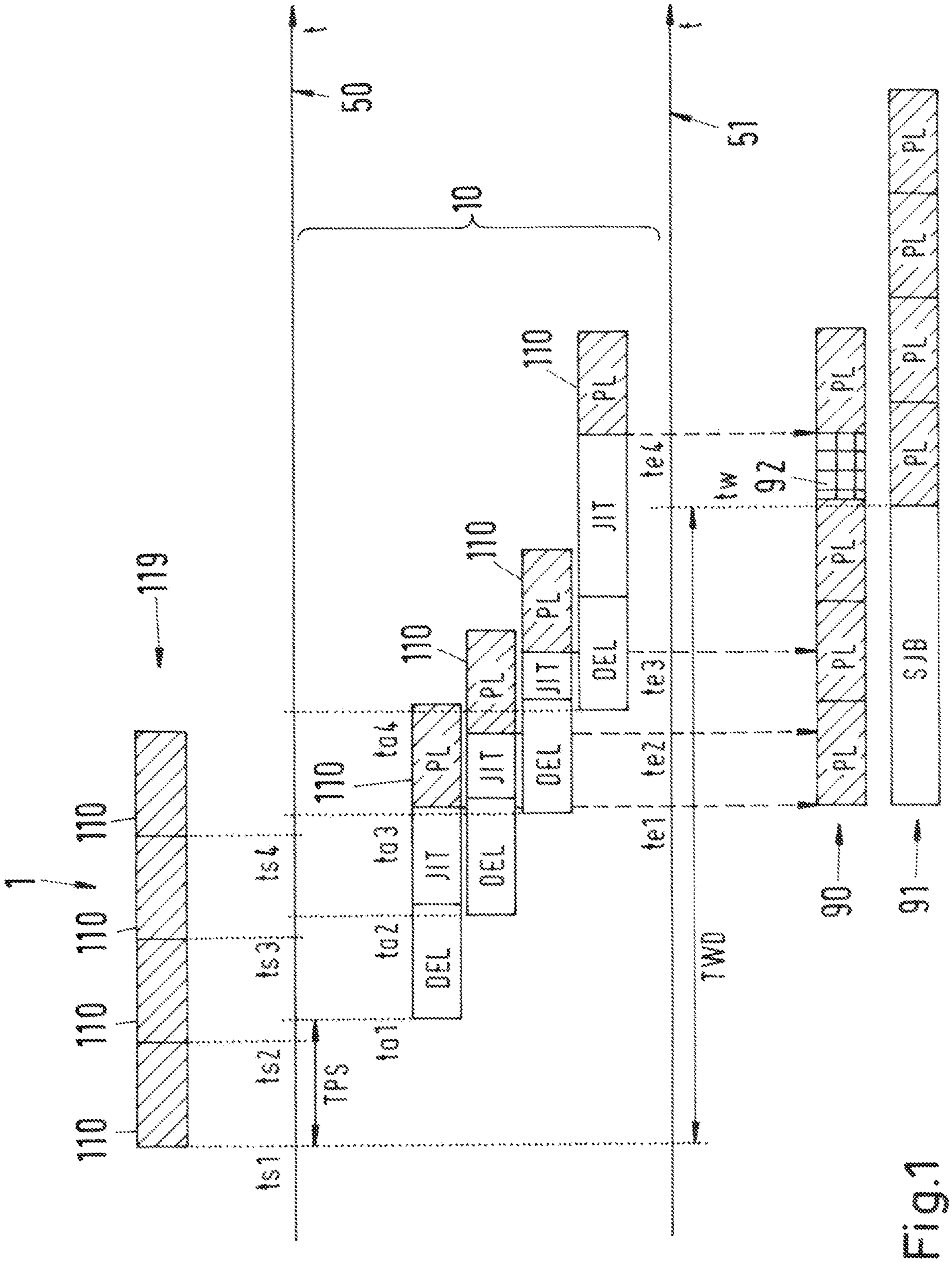

FIG. 1 schematically illustrates the temporal sequence of a method for sending and receiving analogue and/or digital voice content, as is already known in principle in the prior art and is also applied in principle in the context of the method according to the invention. It is noted that the time scale is only to be understood schematically and does not make any statement about the actual time ratios. In particular, the actual transmission times of the voice packets are substantially shorter than illustrated schematically in the sketch.

When transmitting voice via IP-based networks (Voice over IP/VoIP) e.g. analogue voice content 1, for example recorded spoken text, is digitized in the known manner, for example by means of pulse code modulation (PCM), so that the voice content 1 is present at the latest after the digitization as digital voice data. The digital voice data are also termed voice content 1.

The digital voice data are combined in data packets (voice packets 110), wherein only a portion of the entire voice content 1 is contained in one voice packet 110. This is clarified by the vertical lines in the voice content 1. Each of the digital voice packets 110 is also termed a voice sample.

Thus, the voice content 1 is usually divided into a sequence 119 made up of several consecutive voice packets 110. A sequence 119 with four voice packets is shown by way of example in FIG. 1.

Each voice packet 110 contains digital voice data, which comprise a section of, e.g. several milliseconds of the voice content 1 (that is to say a portion of the voice content 1).

Such a section of the (digital or digitized analogue) voice data, which is contained in a voice packet 110, is also termed a payload PL. The voice packet 110 also contains a header H, which contains data for communication control, as an important constituent. For example, the sampling instant of the first voice sample is entered in the header H as timestamp (in the sense of time information specifying the time of sending ts). This is adopted as the time of sending ts of the voice packet 110. Sampling of the voice content 1 is understood to mean sampling analogue voice content 1 with a sampling frequency, for example 8 kHz, during which a digital value is respectively assigned to the voice content 1, that is to say the digitization of the voice content as voice data and the division into packets (payload PL) take place.

Voice packets 110 are created by the transmitter, which is also termed the source (of the voice packet) in technical language, and then transmitted to the receiver, which is also termed the data sink (of the voice packet) in technical language. The transmitter inserts the time of sending ts into the header and sends the voice packet 110. If a voice packet 120 without voice content 1 (not illustrated in FIG. 1 and explained further below) is sent, in which the payload PL is omitted, the time of sending ts corresponds to the time of sending out ta, at which the voice packet 120 is sent. If a voice packet 110 with voice content 1 (illustrated in FIG. 1) is sent, the time of sending out is delayed by the sampling of the voice packet 110. This takes the time period TPS, so that the time of actual sending out of the voice packet 110 (actual transmission time ta) is shifted by the time period TPS, that is to say ta=ts+TPS. This time period TPS, which is required for sampling the payload PL, is also described as the length of the payload and can be considered to be constant (a correction for this is explained further below). Sending out the voice packets 110 is illustrated with reference to the timeline 50 and takes place by means of the transmitter (in the sense of the source of the voice packet).

As illustrated in FIG. 1, there is a certain time after the transmission until a voice packet 110 is received, at the time of receipt te, and it would be possible to start with the output of the payload PL in principle. This is illustrated in FIG. 1 in the transmission channel 10 of the IP-based network for the four voice packets 110, wherein each voice packet 110 is illustrated on one line one below the other, with reference to the timeline 51.

Delay DEL of the voice packet 110 and jitter JIT of the network represent two important influencing variables during the transmission of the voice packet 110 via the transmission channel 10.

Delay DEL or latency essentially refers to the sum of the (physical) signal delays on the transmission channels. Voice transmission via IP networks is accompanied by further delays due to temporary storage and, if necessary, data reduction, compression and decompression of the data. This is not considered further here, because these delays can be considered to be constant over a short time horizon (as can be assumed for the application of the invention). These constant delays should also be included in the delay DEL in the context of this text.

The random temporal fluctuation between the receipt of two voice packets 110, which is technically unavoidable, is termed jitter JIT. This jitter JIT has the consequence that voice packets 110 of the same length, which although they are sent with exactly the same time intervals with respect to one another, arrive at the receiver with different time intervals. This is shown in FIG. 1 by boxes JIT of different width for each of the voice packets 110, of which only the payload PL (which is essential for the invention) is illustrated, and the header H has been omitted for the sake of clarity.

It is noted once more that the temporal length of the individual components (H, PL, DEL, JIT, SBJ) in the illustration neither reproduces the actual time duration of the components relative to one another nor illustrates the timeline with a duration uniform over its length. The illustration is used solely to understand the sequence of the method described according to the invention in the context of the invention, without using a uniform (absolute or relative) timescale.

These different time intervals between the receipt of consecutive voice packets 110 may lead during further processing (e.g. playback or use) of the transmitted voice information 1 to the effect that it may not be possible to connect the payload PL of the individual voice packets 110 to a continuous output stream, as outlined for the first variant of voice output 90 (as an example of processing the received voice data) in FIG. 1. There, the output of the voice information is started immediately after receiving the payload PL of the first voice packet 110 at the time of receipt te1. The payload PL of the second voice packet is received at time te2 before the processing, e.g. playback, of the voice information from the payload PL of the first voice packet is completed. The payload PL of the second voice packet 110 is therefore temporarily stored in the receiver until processing of the payload PL of the first voice packet 110 is completed. The processing of the payload PL of the second voice packet 110 can therefore directly follow the processing of the payload PL of the first voice packet 110. The same is true for the payload PL of the third voice packet 110, so that up to this point for example, a continuous output of the voice information (in the sense of a possible processing of the payload PL) is possible.

However, owing to a particularly long jitter JIT, the payload PL of the fourth voice packet 110 is only received at the time of receipt te4, at which the processing of the payload PL of the third voice packet 110 is already complete.

Any possible desired playback (or other processing) must therefore wait until the time of receipt te4, which leads to a pause or interruption 92 in the voice output (processing the payload). Continuous processing is therefore not possible.

What is known as a "buffer" (jitter buffer) is used in the prior art to compensate for these different time intervals (jitter JIT) when receiving consecutive voice packets 110 and to enable continuous voice output. With respect to voice transmission, a defined time (wait time) is therefore waited after the payload PL of the first voice packet 110 from the sequence 119 of voice packets 110 was received at time of receipt te1 before further processing or voice output. This is illustrated in FIG. 1 in a second variant 91 of the voice output, in which, before the output of the voice information of the payload PL of the first voice packet 110, at time tw, after the receipt thereof at time te1, there is a wait of a static, fixed wait time, which is termed a (static) buffer SJB (static jitter buffer). After the time of receipt te1 of the first voice packet 110, there is therefore a wait for the fixed buffer SJB (in the sense of a period of time) before playback/processing of the voice message is started. During the buffer SJB, subsequent voice packets 110 continue to be received and stored temporarily. This means that after the playback of the voice information (payload PL) from the first voice packet 110, the payload (PL) of the subsequent voice packet 110 has been received already at time of receipt te2 and is stored temporarily, so that this subsequent voice packet can be played back directly following the payload PL from the first voice packet 110. The same is true for the further following voice packets 110, so that a continuous playback of the whole transmitted voice content 1 by the receiver is possible. The term "playback" is to be understood to be synonymous with "processing" in the sense of the invention and should also comprise other processing of the received payload PL from the voice packets 110 as an audible playback. Examples for this are described below.

The (static) buffer SJB therefore effects an additional deliberate delay of the processing (in the example described: voice output), in order to subsequently output the voice data isochronously. Voice packets 110 which arrive later than the delay time of the static buffer SJB can no longer be incorporated into the output data stream. The size of the buffer SJB is added to the delay DEL. The size of the buffer SJB therefore allows the choice between more delay (and lower packet loss rate) or less delay (and a higher packet loss rate). If a subsequent voice packet 110 is lost in the sense that its payload PL is not yet present for processing/output after processing/output of the payload PL of the preceding voice packet, there is an interruption in the continuous processing/voice output.

The following method is therefore known from the prior art:

Voice packets 110 with a defined portion of the entire voice content 1 (digital or digitized voice content) as payload PL are created (in practice e.g. with a payload length of 10 ms) in the transmitter (data source) and sent at the same time interval, i.e. with the same transmission frequency. This is shown in the timeline 50 by equidistant times of sending ts1 to ts4. The voice packets 110 arrive delayed at the receiver (data sink) due to the delay DEL and jitter (JIT) on the transmission channel 10. The delay DEL over the transmission channel 10 is to be considered constant for the short period under consideration, which is applied in the context of the invention for consecutive voice packets 110 (e.g. a radio message in a digital radio connection), whereas the jitter JIT per voice packet 110 may be different and is also usually within a certain jitter bandwidth. This leads to the voice packets 110 no longer arriving at the receiver with a constant time interval with respect to one another. This is shown in the timeline 51 by non-equidistant times of receipt te.

In order to eliminate these temporal differences in the further processing of the packets, audio output (voice output 90) does not take place immediately after the arrival of the first voice packet 110 at time of receipt te1. The voice output 90 is additionally delayed further by the buffer SJB (time of the jitter buffer) to time tw.

If one were not to do this and instead begin with the further processing immediately upon arrival of the first voice packet, this would lead, in the above example according to FIG. 1, to a voice gap (interruption 92 during the voice output) between the consecutive third and fourth voice packets 110, as the fourth voice packet 110 would not yet have arrived after the voice output of the payload PL of the third voice packet 110.

It can clearly be seen from FIG. 1 that the start of the voice output tw depends on when the first voice packet 110 arrives at the receiver (time te1) and how large the buffer SJB is. The start of the voice output is therefore dependent on the delay DEL, the jitter JIT of the first voice packet of a sequence of voice packets 110 and the length of the buffer SJB (jitter buffer). The delay DEL and the buffer SJB can be considered to be constant in the context of normal voice transmission (e.g. as a radio message). Jitter JIT remains as a variable influencing variable.

With respect to the use of voice over IP for the transmission of e.g. operational ground-to-air communication between an aircraft and air traffic control, there is an additional factor which is directly connected to jitter JIT and the delay DEL of the voice packets: the echo.

Irrespective of the specific example, this is always true if a radio message (e.g. from air traffic control) should be sent to an aircraft which is moving in airspace, e.g. from air traffic control, which is monitoring the relevant airspace. The airspace that is actually affected cannot always be covered by means of a single radio transmission route by a single radio transmitter. Rather, in many cases, several radio transmitters are provided (as ground stations) in a spatially distributed manner, which send out a radio message to an aircraft in the airspace from various locations, so that the radio receiver in the aircraft can receive the radio message in the whole airspace. Thus, safety-relevant communication can be realized, as is necessary e.g. in the case of ground-to-air communication in radio operation.

The radio transmission by the radio transmitters on the ground to the radio receivers in the aircraft essentially takes place at the speed of light. In the case of the radio links in question here, delay differences during transmission can be disregarded. The radio messages received by the radio receivers (which are formed by the transmitted voice content 1) are then generally output by the radio receivers directly. This is common practice and is not the subject of the invention. Usually, this radio link between radio transmitters and radio receivers is also not realized as voice over IP transmission. With respect to the particularly preferred embodiment of ground-to-air communication described here, the invention relates to jitter compensation via IP-based networks, which are for transmitting a voice message from a central source (termed a "transmitter" in the sense of a transmitter in voice over IP transmission in this text) to a radio transmitter (termed a "receiver" in the sense of a receiver in voice over IP transmission in this text). Several radio transmitters then send the voice message into the airspace by radio, for receipt by a radio receiver on-board the aircraft.

A radio transmitter therefore receives the digital voice packets 110 via a voice over IP connection, combines the payloads PL thereof to form the voice message 1, which is then sent out by radio in a modulated manner using conventional radio technology. This is what is meant with "processing" of voice content contained in the voice packets and ultimately also output of the voice content.

Also, if relevant delay fluctuations of the various transmissions of the same radio message, which lead to an echo during playback of the same radio message via various radio transmitters (CLIMAX operation), generally do not occur during the actual radio transmission between radio transmitters and radio receivers, the delays of the radio messages via the IP-based network by means of voice over IP from the transmitter (source of the radio message) to the receiver (sink of the radio message for the voice over IP transmission, which is the radio transmitter for sending out the radio message via radio) are different. This leads to various times of sending out for the same radio message by the various radio transmitters and creates an echo during the playback of the radio message in the receiver. The entire transmission path of the radio message from the source of the radio message (e.g. air traffic control) to the playback after the receipt of the radio transmission by the radio receiver is termed the radio channel, wherein the delay differences usually causing the echo occur during the voice over IP transmission by means of the IP-based network and cause the echo. In this respect, radio channel in the sense of the invention always also means transmission channel in the general sense. The receipt (and sending) of a contiguous voice content 1 is also termed a radio message in the described example. Accordingly, radio message also always means voice content in the general sense.

Figure 2:
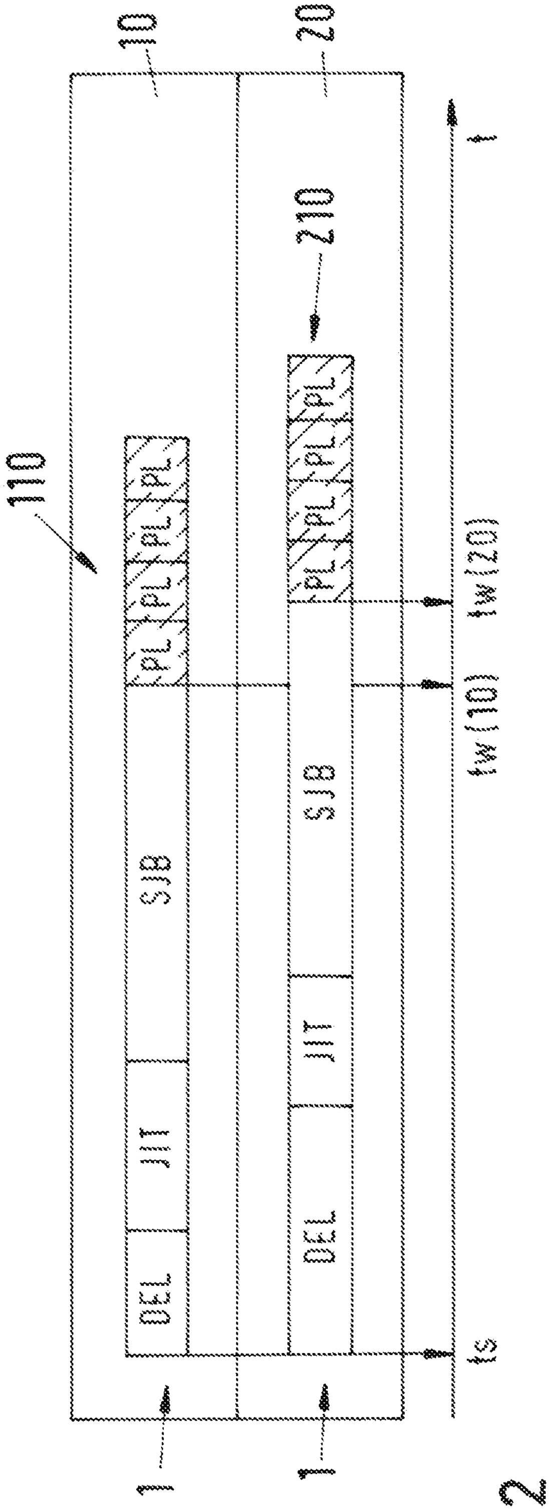

If the voice packet 110 with identical voice content 1 is successfully transmitted by the transmitter via two or more radio channels, the voice packet 110 is transmitted by the transmitter as voice packet 110 via the first channel 10 and as voice packet 210 via the second radio channel 20. Accordingly, the receiver also receives the first voice packet 110 and the second voice packet 210 via the respective radio channels 10, 20 with identical voice content 1 (FIG. 2). The structure of the voice packets 110 and 210 and the temporal sequence corresponds to the preceding description with respect to FIG. 1 with the voice packets 110. The payload of the voice packets 110 and 210 is identical.

Such a transmission of a voice packet 110, 210 with identical voice content 1, on radio channel 10 and on radio channel 20 (also termed voice packets 110, 210 to differentiate the radio channels 10, 20) is also termed CLIMAX operation. This is not limited to two radio channels 10, 20, but rather applies generally for several radio channels.

CLIMAX operation (in German "Überdeckung"/in English "overlap") is understood to mean the parallel and fundamentally simultaneous sending (broadcasting) of a voice packet 110, 210 by the transmitter from several transmission locations (radio transmitters) on the same frequency. The transmitter (as source of the radio message) therefore makes use of several different radio transmitters at various locations, which send out the same voice packet 110, 210 on the same radio frequency as simultaneously as possible, so that the voice contents overlap at the radio receiver, insofar as the radio message sent out by radio by the various radio transmitters is received at a (the same) receiver. This use case is a particularly preferred application of the invention.

CLIMAX operation of this type is therefore used for example in ground-to-air communication, in order to cover very large airspaces or regions with spatially difficult coverage, caused for example by mountains, using one transmission frequency. Upon receipt of the radio message 1 (i.e. of the transmitted voice content), the pilot may be located in a region, in which they receive the voice packets 110, 210 with the same voice content 1 from more than one radio transmitter location.

Therefore, it must be ensured by means of suitable technical methods that the sending out of a radio message takes place as simultaneously as possible at all radio transmitters (according to the regulation ED-137, within 10 ms), in order to prevent the occurrence of an echo of the radio message for the pilot.

FIG. 2 actually shows a situation, in which a radio message starting from a central transmitter (as source of the radio message) is sent out by sending out four voice packets 110 on a first radio channel 10 and four voice packets 210 on a second radio channel 20, in each case via a voice over IP connection, wherein the four voice packets 110 and the four voice packets 210 have identical voice content 1. The voice packets should be processed simultaneously in the receiver. In the particularly preferred use case of CLIMAX operation described here, this means that several receivers are provided, which respectively have one radio transmitter, which broadcasts received voice packets 110, 210 by radio via the voice over IP connection for receipt by one radio receiver. So that no echoes occur at the radio receiver, the voice packets 110, 120 received via the voice over IP connection should be sent out simultaneously by each radio transmitter (which corresponds to one receiver of the voice over IP connection in each case) at the various radio transmitter locations.

It can be seen in this example that the delay DEL from the transmitter to the receiver on the radio channel 20 is longer than to the receiver on radio channel 10. The differences in the delay occur owing to different interferences or properties in the radio channels 10, 20 (or more generally transmission channels 10, 20). This (different) delay DEL in the respective radio channel 10, 20 is to be understood as constant for the given short period under consideration of a radio message, so these differences in the delay can be termed static delay differences. In principle, these can also be determined, for example from the current positions of transmitter and receiver on the respective radio channel 10, 20 (delay differences owing to different distance) or by determining interferences, e.g. in the context of connection set-up on the radio channel 10, 20.

Thus, solely owing to the different delay DEL of the voice packets 110, 210 on the various radio channels 10, 20, there are different times of output tw of the identical voice content 1 at the receiver owing to the transmission of the same voice packet 110, 210 via the various radio channels 10, 20, namely the time of output tw(10) on radio channel 10 and the time of output tw(20) on the radio channel 20.

In the preferred use case, the time of output ta at the receiver means the sending out of the voice content by the radio transmitter. The voice content 1 is then only output at the radio receiver as analogue speech. Sending out the voice content via radio then leads to an undesirable echo in the (analogue) playback of the voice information by the radio receiver. Therefore, the entire system for processing the voice packets during and after the receipt via the IP-based network connection (voice over IP) can be understood as a receiver in the sense of the invention. In the example case described, this is therefore the system made up of the radio transmitter (as receiver of the voice packets via the voice over IP connection) and the output (in the sense of further processing), here by sending out the voice information via radio and receiving by the radio receiver, which then outputs the voice content in an audible manner. The radio link (in the sense of a further processing of the received voice packets for output at the end of the radio link), which is downstream of the receiver, in practice no longer leads to (new or further) delay differences on the various radio channels. In the following, only the behaviour during voice over IP transmission via the IP-based network is considered, irrespective of whether a direct (analogue) voice output takes place directly after the voice over IP transmission or only after subsequent radio transmission between radio transmitter and radio receiver.

A function named "Dynamic Delay Compensation (DDC)" is described in the standard ED-137 in order to compensate static delay differences from the transmitter to the receiver via various transmission or radio channels 10, 20. Here, the different values of the delay DEL are adjusted in such a manner for the various channels 10, 20 by an additional delay correction DDC, that the sending out on the "fast" radio channels 10 is delayed by the delay correction DDC, until it corresponds to the delay DEL on the "slow" radio channels 20. This delay due to the delay correction DDC is termed dynamic delay compensation. This delay correction can be realized by a delayed sending out at the transmitter location of the "faster" radio channel 10, that is to say in the region of the transmitter, or by a wait time during the processing of the voice information by the receiver, analogous to the buffer. The delay difference may be known and/or calculable and correspondingly applied in the transmitter or receiver. The delay difference may even be determined and applied during a connection period by the receiver in the previously described manner.

Figure 3:
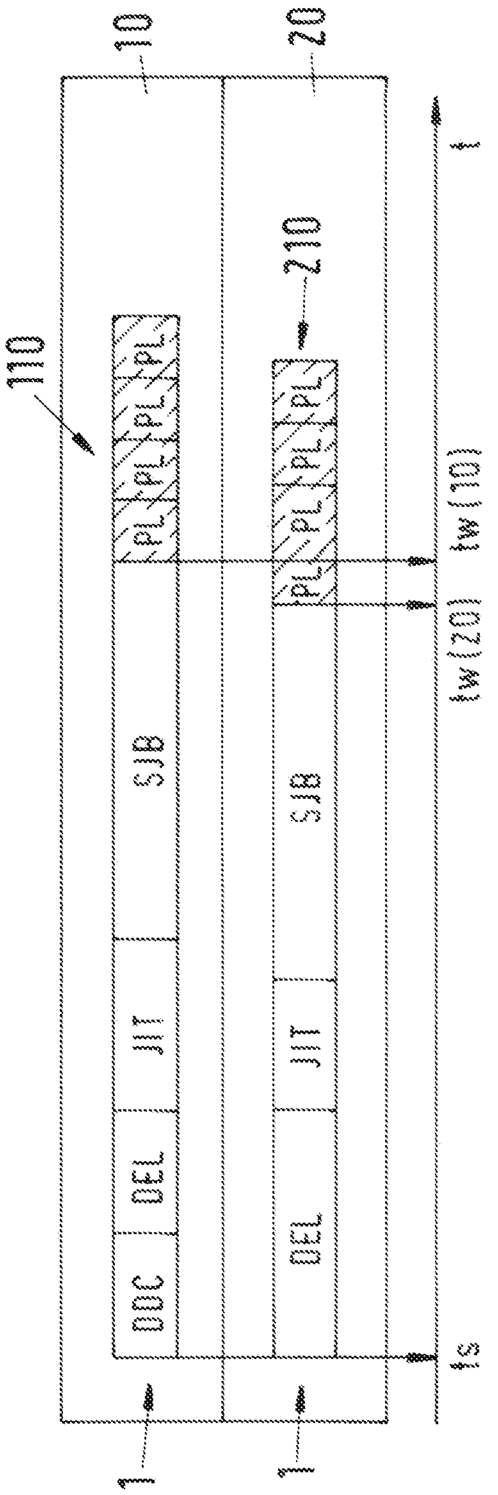

The result of applying the delay correction is shown in FIG. 3 for the case according to FIG. 2. Therefore, as a result, the sum of the actual delay of the voice packet 110, 210 and—if present—the delay correction DDC is the same for each radio channel 10, 20. The occurrence of the echo is then no longer dependent on the different delay DEL.

However, FIG. 3 makes it clear that even the jitter JIT, i.e. the arrival time of the voice packets 110, 210 varies for each radio channel 10, 20 (transmission channel). It is not difficult to see that, during CLIMAX operation of radio channels 10 and 20, owing to the delay differences, there would also be problems with echo, for which only the different jitter JIT is responsible. This also leads to different times of output tw(10) via radio channel 10 and tw(20) via radio channel 20 for the identical voice content 1.

As before, the time of receipt te1 of the first voice packet 110, 210 from a sequence 119 (cf. FIG. 1) determines the start of the voice output tw. If the first voice packet 210 arrives at an early time when considered relative to the voice packet 110 (i.e. the current jitter is smaller for this voice packet 210), the voice playback begins earlier. If the first voice packet 110 arrives at a late time when considered relatively (i.e. the current jitter is larger for this voice packet 110), the voice playback begins later, wherein "voice playback" or "voice output" also means re-sending out by radio.

This problem is not taken into consideration in the ED-137 standard by the delay correction when using several radio or transmission channels.

However, this problem is overcome by means of the proposed method for dynamic jitter compensation by means of a dynamic buffer. It is achieved that the start of the voice output tw of a radio message (or a sequence 119 of voice packets 110, 210) is no longer dependent on the jitter of the first voice packet 110, 210 of the sequence 119 of voice packets.

This is achieved according to the invention, in that the actual time of receipt (synonymous with the actual jitter) is determined for the first voice packet 110, 210 of a sequence 119 of voice packets 110, 210 representing the voice message (i.e. the voice information 1) and the buffer is fixed (in the sense of determined or specified) as a dynamic buffer DJB as a function of the actual time of receipt (synonymous with the actual jitter). The temporal length of the dynamic buffer is fixed to be dependent on the actual jitter in such a manner that the time period made up of jitter JIT and dynamic buffer DJB is constant.

Figure 4:
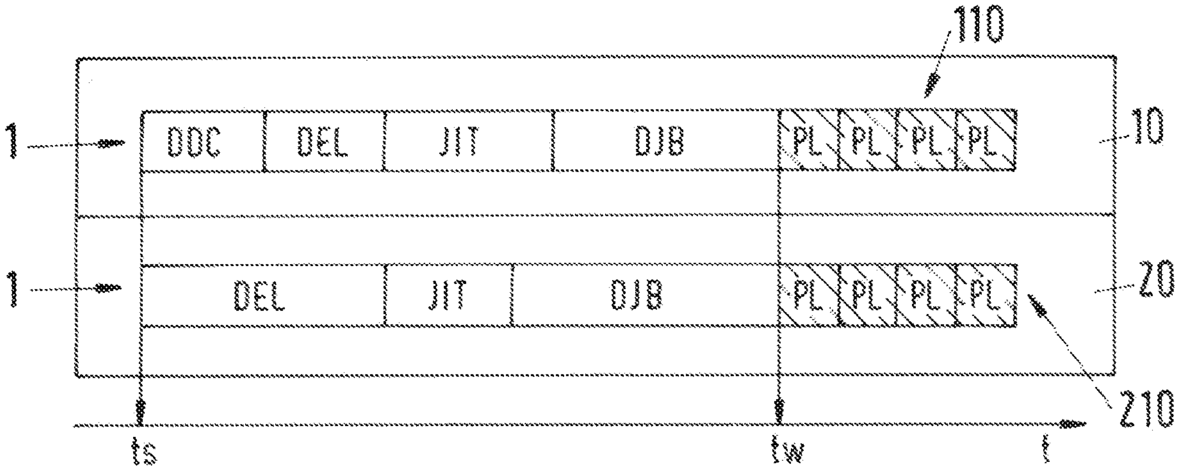

This is illustrated in FIG. 4 for the temporal sequences described in FIGS. 2 and 3. Instead of a fixed buffer SJB according to FIG. 2 or 3, according to the invention there is the dynamic buffer DJB, which is orientated dynamically on the jitter (jitter value, actual time of receipt) of the first voice packet 110, 210 of the radio message or the voice content 1. If the first voice packet 110, 210 comes early when considered relatively (low jitter value), this leads to a temporally longer buffer DJB. The sum of the actual jitter JIT (jitter value in the sense of the random time of receipt with respect to no jitter or the shortest jitter that occurs) and the dynamic buffer DJB is therefore constant according to the invention. Receipt here means the receipt in the voice over IP transmission.

Figure 5:
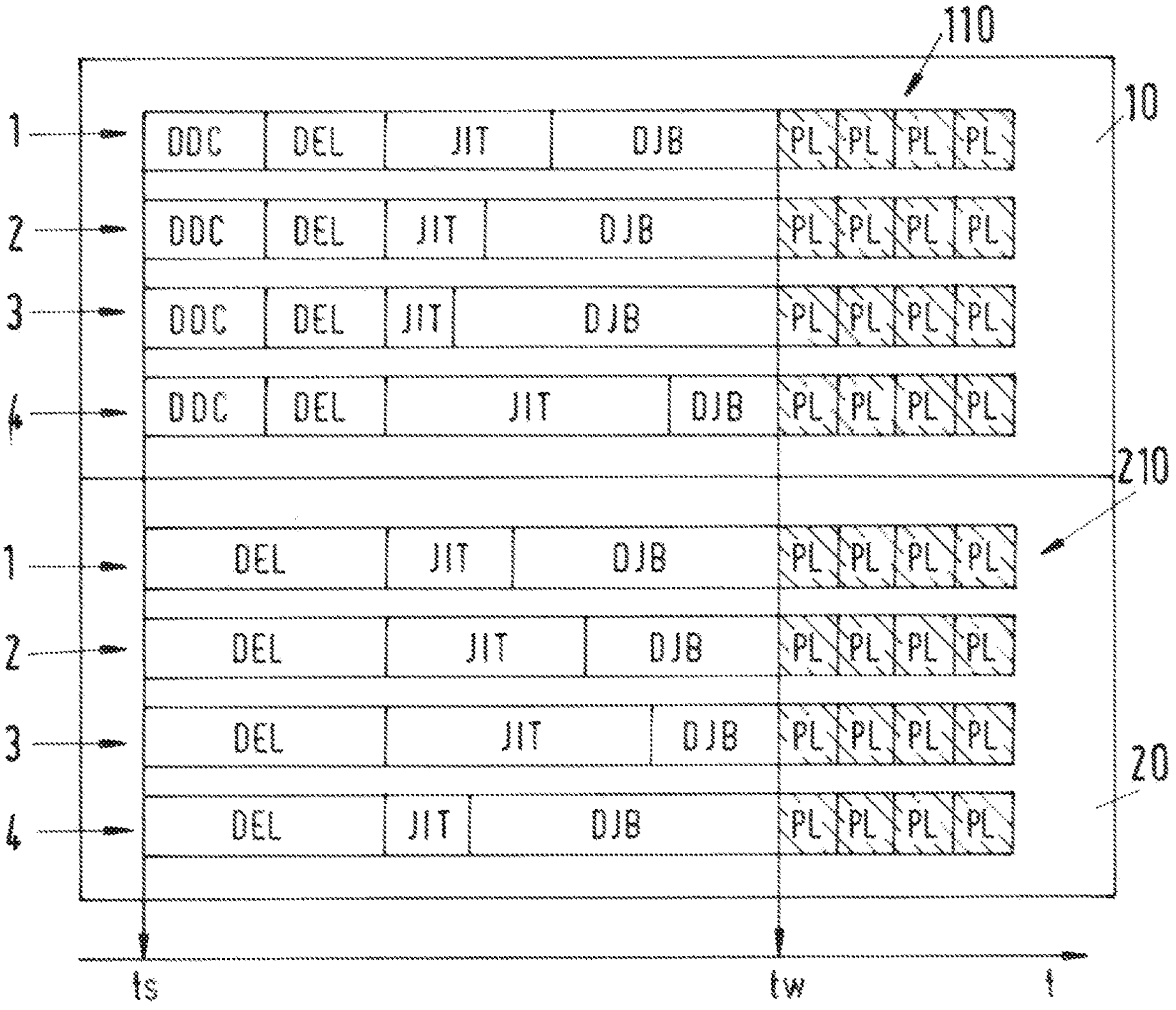

If one then considers several radio messages 1, 2, 3, 4 on various radio channels 10, 20, one can see in FIG. 5 that the actual jitter JIT for each radio message 1, 2, 3, 4 and each radio channel 10, 20, is different.

Nonetheless, the start of the voice output tw is the same for all radio messages 1, 2, 3, 4 within a radio channel 10, 20 and for all radio messages 1, 2, 3, 4 on all radio channels 10, 20. The further processing of the voice packets therefore takes place simultaneously for all radio messages and for all of the transmission channels.

Upon arrival of the first voice packet 111, 211 of a sequence 119 of voice packets 110, 210 (that is to say e.g. one of the radio messages 1, 2, 3, 4), the challenge when implementing the invention consists in detecting how high the actual jitter of this first voice packet 111, 211 actually is, or expressed differently, how large the relative packet transmission duration of this first voice packet 111, 211 is with respect to the total occurring random temporal fluctuations between the times of receipt of voice packets (jitter) during receipt of voice content via IP-based networks. Therefore, it must be determined quantitatively, whether the first voice packet 111, 211, which fixes the length of the buffer DJB, arrived early or late, when considered relatively.

This functionality is not known in a "normal" voice over IP application and is also not described in the ED-137 standard. Whenever a voice over IP connection (in the sense of a transmission of analogue voice contents 1, 2, 3, 4 via an IP-based network) between a source (transmitter) and a sink (receiver) is not set up for the first time when a sequence 119 of voice packets 110, 210 with the voice content represent digitized voice data (payload PL) should be broadcast, but rather a connection exists over a certain connection period, in which several (separate) voice contents (radio messages) 1, 2, 3, 4 should be transmitted, it is possible to determine the actual jitter of a first voice packet 111, 211 of the sequence 119 of voice packets 110, 210. This is possible for example in the case of telephone calls by means of voice over IP connections, if a connection is set up (permanently) for the duration of the telephone call, but in pauses in the conversation, no voice packets with voice content 110, 210, but rather voice packets without voice content 120 used for maintaining the connection are transmitted. As soon as new voice content 1, 2, 3, 4 is transmitted, a new dynamic buffer DJB in the sense of the invention is established.

A further use case is radio connections, for example in ground-to-air communication, in which it is important that the connection exists permanently, because messages have to be transmitted fast. A new connection set-up for each radio message 1, 2, 3, 4 would take too long and holds too many risks. A radio connection of this type may for example be developed according to the ED-137 standard. An application of this type is described in detail below. The invention is not limited to this however, but rather can be used in all applications in which a connection for voice communication exists over a relatively long time (permanently).

Figure 6:
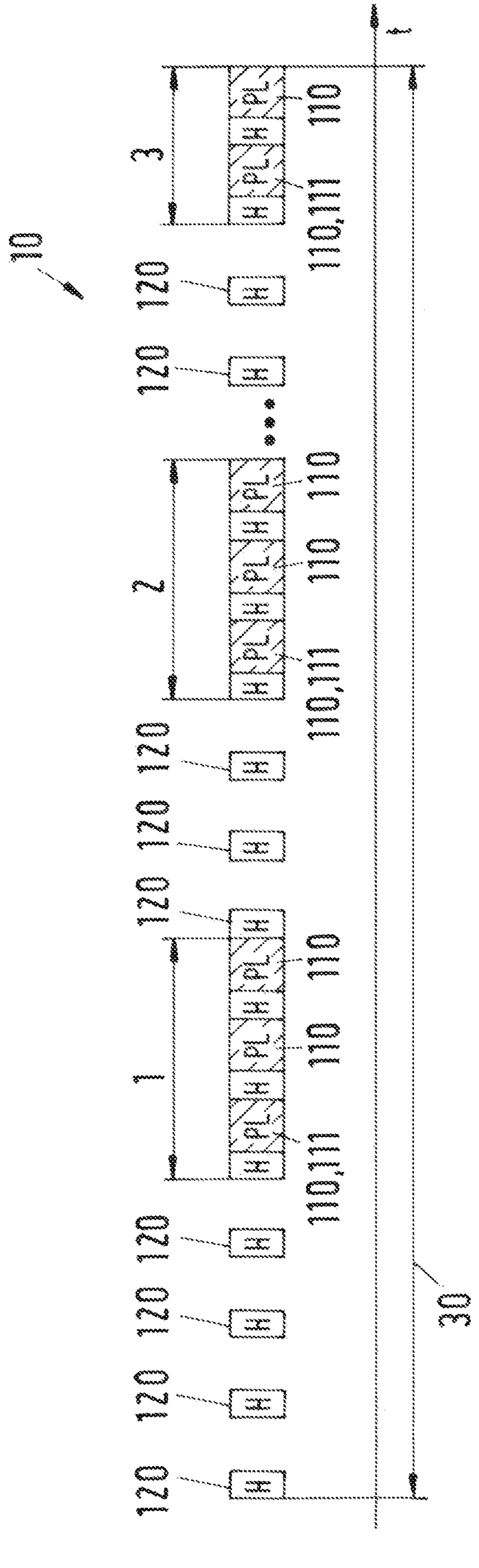

In the context of a use according to the ED-137 standard, a permanent voice over IP connection exists in the IP-based network, during which voice packets 110, 120, 210 are constantly transmitted in RTP format for each radio channel 10, 20, which are used both for voice transmission and maintaining the connection. This is illustrated in FIG. 6 for a connection period 30 and the radio channel 10, in which three radio messages 1, 2, 3 (with voice content in digitized form, that is to say voice data) are illustrated by way of example, wherein the three points indicate that not all radio messages 1, 2, 3, 4 and voice packets 110, 111, 120 are illustrated. The radio messages 1, 2, 3 in each case contain voice packets 110 with voice content, i.e. with header H and payload PL and form a sequence 119 of voice packets. The same applies analogously for the further radio channels 20.

If no radio message 1, 2, 3, is currently being transmitted, "empty" voice packets 120 without voice content are transmitted, which do not have any voice data (payload PL) and only have a header H. The sending out of the voice packets 110, 120 preferably takes place at a predetermined sending clock rate.

The first voice packet 111 of a sequence of voice packets 110, which form a radio message 1, 2, 3, is in each case a distinguished voice packet 111, which is distinguished in that this voice packet is the first voice packet 110 with voice content, which follows one or more voice packets 120 without voice content and therefore indicates the start of a new radio message 1, 2, 3. For this first voice packet 111 with voice content of a sequence of voice packets, the actual time of receipt (i.e. the actual jitter) of this voice packet 111 is determined by comparing the time information in the received voice packet 111 with the receiver time upon receipt. The buffer DJB (dynamic buffer/jitter buffer) according to the invention is determined as a function of the actual time of receipt.

With the aid of this permanent connection during the connection period 30 and the voice packets 110, 120 exchanged during the connection period 30, it is possible, in a simple manner, to determine the shortest packet delay, when considered relatively, and thus to calculate the actual jitter in the receiver. If, upon arrival of the first voice packet 111 to be played back of a sequence 119 of voice packets 110, it is then known what actual jitter (jitter value) or time of receipt this first voice packet 111 has, the delay time until the start of the playback of the voice packet (i.e. the buffer DJB according to the invention) can be dynamically adjusted accordingly.

The procedure according to the invention therefore consists of two functional parts:

Part A:

Determining the minimum packet delay between transmitter (data source) and receiver (data sink) during the transmission via the IP-based network (voice over IP)

Part B:

Delaying the first voice packet 111 of a radio message 1, 2, 3 (sequence 119 of voice packets) by dynamically adjusting the buffer DJB (in the sense of the size of the buffer)

These two parts operate independently of one another are both executed constantly. The procedure is presented in detail in the following:

Part A

The voice packets 110, 120 are created by the transmitter (data source) according to the ED-137 standard and labelled as RTP packets. The sampling instant of the first voice sample is entered in the RTP header H as a timestamp ($T_{RTP}$). This is adopted as the time of sending ts of the voice packet 110 (also RTP packet). Sampling of the voice content 1 is understood to mean sampling analogue voice content 1 with a sampling frequency, for example 8 kHz, during which a digital value is respectively assigned to the voice content 1, that is to say the digitization of the voice content as voice data and the division into packets (payload PL) take place.

After the sampling, the voice packet 110 is transmitted via the IP-based network to the data sink by means of voice over IP, wherein the payload PL is also appended to the header H. The relative or actual time of sending out for the voice packet 110 at the transmitter is therefore given by the sum of the timestamp $T_{RTP}$ (time of sending ts) and the length or duration TPS of the payload PL (that is to say the temporal length or size of the voice data contained). For an RTP packet, the length or duration of the payload PL may also be termed $RTP_{PL}$ and may in practice be e.g. 10 ms.

For voice packets 120 without voice content (also termed R2S packets), the duration of the sampling is omitted, i.e. the R2S packet is shorter by the length or duration TPS of the payload PL (termed $RTP_{PL}$ for RTP packets). In voice packets 120 without voice content, the timestamp TRIP therefore directly corresponds to the time of sending (time of sending ta). This difference in the two types of voice packets 110, 120 is in fact taken into account in that the receiver time is standardized to voice packets 120 without voice content or correlates with the same and the expected time of receipt is correspondingly corrected by the duration of the payload $RTP_{PL}$.

A timer (receiver clock $T_{RECEIVER}$, termed $T_{SINK}$ in the following) runs in the receiver (data sink) with the same nominal frequency as a timer of the transmitter (transmitter clock of the data source). In other words, the clocks (timers) of transmitter and receiver run at the same speed for the time periods considered in the context of the invention of the order of magnitude of a radio message. Over longer times, design-mediated deviations of the timers of sink and receiver result, which are corrected automatically according to preferred embodiments of the invention. This has already been described and is also shown once more in the algorithms according to FIGS. 7 and 9, which are described below.

After the set-up of a session (in the sense of a connection of transmitter and receiver, which is maintained for the connection period 30), the timer $T_{SINK}$ is set to the time value $T_{RTP}+RTP_{PL}$ of the first arrived voice packet 110 with voice content (RTP packet) or the first arrived voice packet 120 without voice content (R2S packet), where $RTP_{PL}=0$ applies for a voice packet 120 without voice content. Thus, the time which is required for the sampling of the voice packet 110 for the payload PL, i.e. the duration $RTP_{PL}$ is included. This in fact corresponds to a standardization of the receiver clock to the transmitter clock with respect to the delay of voice packets 120 without voice content.

As a result, after the receipt of a voice first packet, termed the initial packet, during a connection period on a transmission channel of the voice packet, the receiver, a receiver clock is therefore initialized using a transmitter time by means of the time information in the initial packet, so that the receiver time correlates with the transmitter time when sending out the voice packet.

From then on, the times (timer values) $T_{RTP}+RTP_{PL}$ of the arriving RTP and R2S packets, i.e. the timestamp $T_{RTP}$ of the voice packet 110, 120 (if appropriate corrected by the duration of the payload $RTP_{PL}$ for voice packets 110 with voice content) are compared with the receiver time (timer value of the timer in the sink) upon receipt of the voice packet, in order to determine a minimum relative packet transmission duration.

Figure 7:
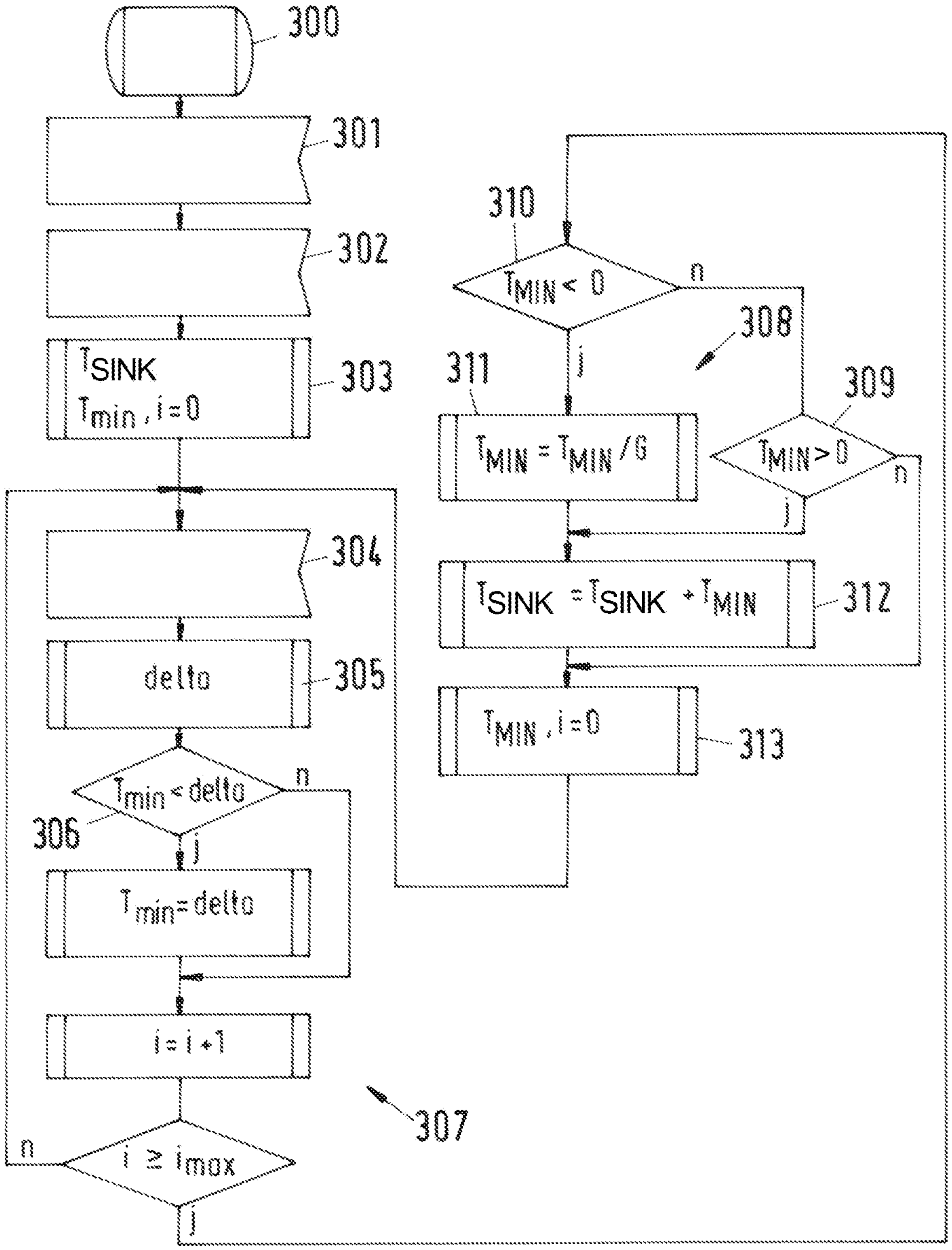
FIG. 7 shows flow charts for the initialization according to the invention of the receiver clock and the determination according to the invention of a minimum relative packet transmission duration.

Algorithmically, this can be achieved as follows:

The start 300 of the algorithm shown in FIG. 7 begins after the establishment of the set-up 301 of a session and the receipt 302 of a first voice packet 110, 120 after the set-up of the session with the setting 303 of the receiver time $T_{SINK}=T_{RTP}+RTP_{PL}$. Thus, the receiver time $T_{SINK}$ is correlated with the transmitter time $T_{SOURCE}$ at the time of sending ts of the voice packet 110, 120, which is entered in the header H of the voice packet 110, 120, i.e. $T_{SOURCE}$ at the time ts is $T_{RTP}$. A possible duration of the payload $RTP_{PL}$ for a voice packet 110 with voice content 1 is corrected.

Within an adjustable interval $T_i$ (e.g. $i_{max}$ is equal to 100 or 200 voice packets) during the connection duration 30, the following processing is carried out after every receipt 304 of a voice packet 110, 120 (RTP or R2S packet).

At the start of each interval $T_i$, a variable $T_{MIN}$ is set to the value $-MAX_{JITTER}$, e.g. −200, wherein $MAX_{JITTER}$ specifies a maximum delay of the time of receipt, which must be taken into account. This corresponds to the maximum jitter that occurs. The time is specified as values without a unit of measure in this case. For example, a unit of measure may be 125 μs (⅛ kHz), i.e. the sampling time. However, the invention also functions with any desired other sampling times.

First Step 305:

Within an interval $T_i$, the deviation of the actual time of receipt at the receiver (sink) is then calculated for each voice packet 110, 120 (RTP packet, R2S packet). This takes place in principle by means of the formation of the difference delta of the actual time of transmission (for voice packets 120 without voice content, R2S packets: timestamp $T_{RTP}$, as $RTP_{PL}$=0; for voice packets 110 without voice content, RTP packets: timestamp $T_{RTP}+RTP_{PL}$) and the receiver time (timer $T_{SINK}$):

$$delta = T_{RTP} + RTP_{PL} - T_{SINK}$$

where $RTP_{PL}$=0 applies for voice packets 120 without voice content (R2S packets).

This is based on the following idea. After the described initialization of the receiver time, the difference delta is equal to zero, if the jitter upon receipt of the voice packet 110, 120 for initializing the receiver time and upon receipt of the currently considered voice packet 110, 120 was equal, as the correlation of the receiver time corresponds exactly to the transmitter time plus the delay and the jitter.

If delta is greater than zero, the current voice packet 110, 120 was faster than the hitherto fastest voice packet, which formed the basis of the initialization or later adjustment of the receiver time. If, on the other hand, delta is less than zero, the current voice packet 110, 120 was slower than the voice packet which forms the basis of the receiver time.

In this respect, the receiver time (here: $T_{SINK}$) is therefore in each case compared with the time information, contained in the header H of the subsequent voice packet 110, 120, for the transmitter time (here: $T_{RTP}$ plus, if appropriate, $+RTP_{PL}$) when sending out the voice packet 110, 120, and a relative packet transmission duration is determined relative to the receiver time, which corresponds to the value delta.

Second Step 306:

Therefore, the fastest relative voice packet 110, 120 during the connection period can be determined in principle as a result.

According to an actual embodiment, it is additionally proposed that initially, in each interval Ti, the voice packet 110, 120 with the shortest relative delay (that is to say with the lowest relative jitter) is found by comparing the variable $T_{MIN}$ with delta. To this end, the variable $T_{MIN}$, which is set at the start of each interval Ti to the highest relative jitter value ($T_{MIN}=-MAX_{JITTER}$) in principle, which is absolutely conceivable or is never reached in practice, is set to the value of delta, if a voice packet 110, 120 with a shorter relative delay is found in the interval $T_i$, that is to say $T_{MIN}$<delta applies.

When the measurement interval $T_i$ ends, $T_{MIN}$ therefore specifies the shortest relative delay of a voice packet 110, 120 that has occurred in the measurement interval $T_i$.

A resultant minimum relative packet transmission duration is stored temporarily as $T_{MIN}$, until the interval Ti ends.

Third Step 308:

After the or each interval $T_i$ ends 307, the receiver time $T_{SINK}$ is adjusted in such a manner as a function of the temporarily stored minimum relative packet transmission duration $T_{MIN}$ that the receiver time $T_{SINK}$ correlates with the transmitter time $T_{SOURCE}$ when sending out the voice packet with the minimum relative packet transmission duration.

This can be realized algorithmically using the following steps:

If the request 309 $T_{MIN}$ is greater than zero, this means that within the last interval Ti, at least one voice packet 110, 120 with shorter jitter JIT (i.e. shorter packet transmission time, delay) than hitherto has arrived. In this case, the receiver time (timer of the data sink, $T_{SINK}$) is corrected as follows (correction 312 of the receiver time): $T_{SINK}=T_{SINK}+T_{MIN}$.

As a result, the receiver time is therefore advanced by the value $T_{MIN}$. The time or timer correction described here is used to synchronize the receiver clock (timer of the sink) to the fastest voice packet 110, 120 within the interval Ti or the entire connection period 30, i.e. the transmitter time and the receiver time are equal for the time of sending and the time of receipt for a voice packet with the shortest jitter JIT that occurs, i.e. the shortest occurring packet transmission time until the receipt.

In the example presented, the adjustment of the receiver time as a function of the temporarily stored minimum relative packet transmission duration therefore takes place in such a manner that the receiver time is set back by the minimum relative packet transmission duration, if this indicates that a voice packet with a shorter packet transmission time was received. This takes place in a simple and reliable manner using the embodiment described here. However, other implementations are also conceivable, for example, that at least a certain number of faster packets must occur in the measurement interval before a correction of the receiver time is undertaken. Random measurement errors can be compensated as a result.

If $T_{MIN}$ is equal to 0, this means that within the last measurement interval $T_i$, at 30) least one voice packet 110, 120 with the same (shortest) jitter JIT (i.e. shortest packet transmission time, delay) as hitherto has arrived. In this case, the receiver time (timer of the data sink, $T_{SINK}$) is not corrected, but rather remains unchanged.

If the request 310 $T_{MIN}$ is less than 0, this means that within the last measurement interval $T_i$, no voice packet with a shorter or the same jitter (packet transmission time, delay) as hitherto has arrived during the connection period 30. In this case, the receiver time (timer of the data sink, $T_{SINK}$) is corrected as follows:

$$T_{SINK} = T_{SINK} + (T_{MIN}/G),$$

where G is a weighting factor.

Due to the weighting 311 of $T_{MIN}$, the receiver time is corrected as a function of the temporarily stored minimum relative packet transmission duration $T_{MIN}$ in such a manner that the receiver time is set back if the temporarily stored minimum relative packet transmission duration indicates that only voice packets with a longer packet transmission duration were received, wherein the receiver time is set back by a defined or definable duration. The receiver time or timer correction described here is used such that the receiver clock is not corrected exclusively in the direction of faster voice packets 110, 102 (with shorter jitter JIT). A correction is also sensible for the opposite direction (only slower voice packets 110, 102 are received over a relatively long time). Thus, the fact may be taken into account, for example that the clocks at the source and sink are not running at exactly the same speed (particularly in the case of a relatively long connection period 30).

Also, it is automatically taken into account that due to a change in the transmission route (i.e. in particular changes in the transmission channel 10) all voice packets 110, 120 arrive later and the previously achieved value of the fastest voice packet 110, 120 (with the shortest jitter JIT) is therefore no longer valid.

The correction method described here takes this into account, in that the receiver time is corrected with a weighting factor (for example a weighting factor 3 is set), if "slower" packets occur exclusively in the measurement interval. Other implementation variants are also conceivable and possible, e.g. the correction by a fixed value or a different weighting factor, preferably in a range between 1 and 10, but also beyond that, if necessary.

This determination of the minimum relative packet transmission duration takes place for voice packets without voice content and voice packets with voice content, wherein the different length of the various voice packets is preferably corrected according to the invention.

After these preceding steps have been carried out, the counter "i" for the measurement interval $T_i$ and $T_{MIN}$=−$MAX_{JITTER}$ is set back in a re-initialization 313 of the interval $T_i$.

Using the described method and algorithm, it is possible to determine the relative minimum packet delay of a voice packet by means of the receiver time $T_{SINK}$. This can be carried out completely in the receiver.

The various previously described steps can also be read on the basis of the flow chart for the initialization of the receiver clock and the determination of a minimum relative packet transmission duration according to FIG. 7. The individual steps of the described method procedure can be understood on the basis of the example log file, an extract of which is illustrated in FIG. 8. For the sake of clarity, the interval $T_i$ for this log file has 10 voice packets and will be considerably larger in real practice, for example 100 or 200 voice packets, and can be fixed by the person skilled in the art in a suitable manner. The weighting factor applied by way of example in the second part of the log file was 3. The "measurement interval" according to FIG. 8 is synonymous with the previously described interval $T_i$.

Part B

After the initialization and adjustment of the receiver time by determining the minimum packet delay between transmitter (data source) and receiver (data sink), which preferably takes place continuously during a connection period 30 after the set-up of a connection between transmitter and receiver by evaluating the received voice packets 110, 120 with and without voice content according to FIG. 7, voice packets 110, 120 are exchanged permanently according to the ED-137 standard until the connection between transmitter and receiver ends.

Figure 9:
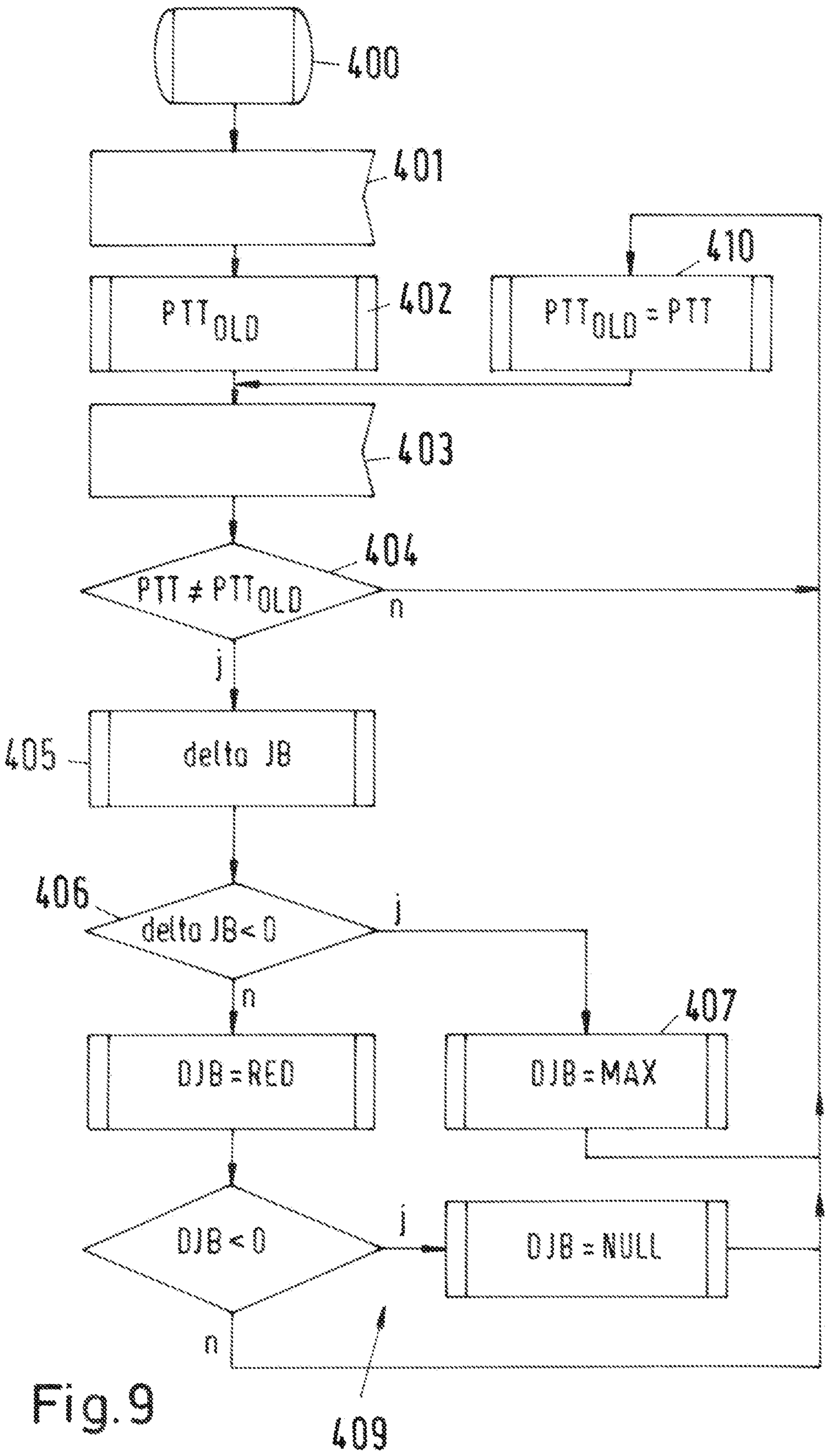
FIG. 9 shows flow charts for delaying the first voice packet of a radio message by dynamic adjustment of the buffer.

According to the method described in FIG. 9, the start 400 of which also takes place with the set-up of a session 401 and which according to the invention can in principle run in parallel with the method illustrated in FIG. 7, the buffer DJB proposed according to the invention is determined as a dynamic jitter buffer as a function of the actual time of receipt of a voice packet.

Normally, during the connection period 30, voice packets 110 with voice content are then transmitted if a radio message 1, 2, 3, 4 should be sent out. The voice packets 120 without voice content are used for line monitoring of the radio channel 10, 20, for the time in which, during the connection period 30, no active radio transmission takes place (cf. FIG. 6). The field PT (Payload Type), which indicates the type of the voice packet 110, 120, is located in the header H of the voice packets 110 with voice content (RTP packet) and the voice packets 120 without voice content (R2S packet), as is defined as a header extension in the ED-137 Standard. A further PTT type field determines whether the voice contents should be broadcast via the flight radio transmitter. If this is set to PTT≠0, the receiver is notified that voice content is transmitted with this voice packet 110. If, by contrast, the PTT type field is set to PTT=0, the receiver is notified that this voice packet 120 is transmitted without voice content. During normal operation, therefore, voice packets 120 without voice content are sent with PTToff (PTT=0) and voice packets 110 with voice content are sent with PTTon (PTT #0). A change from PTToff to PTTon therefore indicates the start of a radio message 1, 2, 3, 4. A change from PTTon to PTToff therefore indicates the end of a radio message 1, 2, 3, 4.

In order to detect such a change, according to FIG. 9, the PTT type fields of two consecutive voice packets 110, 120 are evaluated in each case, wherein a variable $PTT_{OLD}$ indicates which PPT type the preceding voice packet 110, 120 had, and the variable PTT indicates which PTT the current voice packet 110, 120 (or in other words the voice packet following the preceding voice packet) has.

Therefore, if initially voice packets 120 with PTToff are received and at a time, a voice packet 110 with PTTon is received, then this voice packet is the first voice packet 111 of a new radio message 1, 2, 3, 4. This voice packet 111 is then delayed by a dynamic buffer DJB as a function of the relative time of receipt according to the time of the receiver at receipt relative to the time information in the header H of the voice packet 111 for sending out the voice packet 111, until the receiver starts playing back the voice content 1, 2, 3, 4 (or the radio message).

After the start 400 and in the case of a set-up session 401, first the initialization 402 of the variable $PTT_{OLD}$ to the value $PTT_{OLD}=PTT_{off}$ takes place. According to the invention, the receiver determines the value of the variable PTT as PTToff or PTTon upon receipt 403 of each voice packet 110, 120. By querying 404 the variables $PTT_{OLD}$ and PTT, it is determined whether the voice packet is a first voice packet 111 with voice content after at least one voice packet 120 without voice content, for example by means of the query $PTT=PPT_{on}$ && $PTT_{OLD}=PPT_{off}$. If this is not the case, the value of the variable $PTT_{OLD}$ is set to the value of the variable PTT (step 410) and the receipt of a new voice packet 110, 120 is expected.

If this is actually a first voice packet 111 with voice content after a preceding voice packet 120 without voice content, the time of receipt of this first voice packet 111 is determined by comparing the time information in the received voice packet 111 with the receiver time upon receipt. Subsequently, the (dynamic) buffer DJB according to the invention is determined as a function of the actual time of receipt.

According to a preferred embodiment, this functions for example using the procedure described below:

In the case of a voice packet 111, a difference deltaJB is determined 405 of the actual time of receipt $T_{RTP}$+$RTP_{PL}$ from the receiver time $T_{SINK}$, which indicates the expected time of receipt for a voice packet 110 with voice content with the hitherto shortest jitter that has occurred:

$$deltaJB = T_{RTP} + RTP_{PL} - T_{SINK}$$

In the case of a voice packet 120 without voice content, which should not occur at all in this method step, the duration of the payload would be $RTP_{PL}=0$.

This is in accordance with the determination of the relative packet transmission duration 305 by the difference delta according to FIG. 7.

Subsequently, a querying 406 of the difference deltaJB takes place. If deltaJB is greater than zero (deltaJB>0; query 406 "j"), this means that the voice packet 111 has a shorter relative packet transmission time (that is to say with lower jitter) than had hitherto been found during the adjustment of the receiver time according to Part A. Then, the playback of the voice content 1, 2, 3, 4 (radio message) should be delayed by the full length of the predefined maximum buffer (Defaultjitterbuffersize; e.g. 160), which was fixed for the voice packets with the shortest possible jitter JIT beforehand by the person skilled in the art in a suitable manner (setting 407 the buffer DJB to the maximum size MAX=Defaultjitterbuffersize):

DJB=MAX

DJB in this case describes the buffer, i.e. the size or temporal length of the buffer.

If deltaJB is less than zero (that is to say deltaJB<0; query 406 "n"), this means that the voice packet 111 has a longer relative packet transmission time (that is to say with higher jitter) than had hitherto been found during the adjustment of the receiver time according to Part A. Then, the playback of the voice content 1, 2, 3, 4 (radio message) should not be delayed by the full length of the predefined maximum buffer (Defaultjitterbuffersize=MAX). The dynamic buffer DJB according to the invention is reduced by the deviation from the shortest delay (that is to say deltaJB: setting 408 of the buffer DJB to a reduced size RED):

$$DJB = Defaultjitterbuffersize - |deltaJB|$$

|deltaJB| here describes the (positive) value of the inherently negative variable deltaJB.

Should the size of the buffer DJB become less than zero, $JB_{SIZE}=0$ is set (zeroing 409 the buffer DJB.

Also, after that, the value of the variable $PTT_{OLD}$=PPT is set to the value of the variable PTT (step 410) and the receipt of a new voice packet 110, 120 is expected.

The various previously described steps can also be read on the basis of the flow chart for delaying the first voice packet 111 of a radio message 1, 2, 3, 4 (sequence 119 of voice packets) by dynamically adjusting the buffer DJB according to FIG. 9. The individual steps of the described method procedure can be understood from the example log file, an extract of which is illustrated in FIG. 10. The third voice packet illustrated is the first voice packet 110 with voice content (PTTon=1). As this packet is too late by 7 time units, when considered relatively (deltaJB=delta=−7), the predefined maximum buffer (Defaultjitterbuffersize=160) is reduced to 153 according to the calculation 160−7=153.

REFERENCE LIST

1 Voice content, radio message
2 Voice content, radio message
3 Voice content, radio message
4 Voice content, radio message
10 First transmission channel of the IP-based network
20 Second transmission channel of the IP-based network
30 Connection period
50 Timeline during sending
51 Timeline on the transmission channel
90 Second variant of the voice output
91 First variant of the voice output
92 Interruption during the voice output
110 Voice packet with voice content on the first transmission channel
111 First voice packet with voice content
119 Sequence of voice packets
120 Voice packet without voice content
210 Voice packet with voice content on the second transmission channel
211 First voice packet with voice content
230 Packet transmission time or duration
300 Start of the algorithm for determining the minimum packet delay
301 Set-up of a session
302 Receipt of a first voice packet after the set-up of the session
303 Setting the receiver time
304 Receipt of a voice packet
305 First step: Determining the relative packet transmission duration
306 Second step: Determining the voice packet with minimum relative packet transmission duration
307 Checking for the end of the interval
308 Third step: Adjusting the receiver time
309 Query if $T_{MIN}$ greater than zero
310 Query if $T_{MIN}$ less than zero
311 Weighting of $T_{MIN}$
312 Correction of the receiver time
313 Re-initialization of the interval
400 Start of the algorithm for fixing the dynamic buffer
401 Set-up of a session
402 Initializing the variable $PTT_{OLD}$
403 Receipt of a voice packet
404 Querying the variables $PTT_{OLD}$ and PTT
407 Setting the buffer DJB to the maximum size
408 Setting the buffer DJB to a reduced size
409 Zeroing the buffer DJB
H Header of a voice packet (communication control)
PL Payload (voice content as digitized voice data)
DEL Delay of the voice packet on the transmission channel (delay)
JIT Jitter (random temporal fluctuations between times of receipt of voice packets)
SJB Static buffer (jitter buffer) (prior art)
DJB Dynamic buffer (jitter buffer) (invention)
TPS Length of the payload (duration of sending out the payload)
DDC Additional delay correction for various transmission channels
TWD Time period from the sending out of the first voice packet until the start of the processing
PPT PTT field of the current voice packet $PPT_{OLD}$ PPT of the preceding voice packet $T_{SINK}$ Receiver time $T_{SOURCE}$ Transmitter time delta Difference of the actual time of receipt and the receiver time deltaJB Difference of the actual time of receipt and the receiver time ts Time of sending of the voice packet ta Actual time of transmission (time of sending out)

te Time of receipt of the voice packet tw Start of the voice output (time of output or time of processing)

The invention claimed is:

1. A method for jitter compensation of random temporal fluctuations, which are termed jitter, between the times of receipt of voice packets when receiving voice content via internet protocol-based networks, in which a sequence of voice packets with or without voice content is received by a receiver for processing voice content contained in the voice packets, a voice packet with voice content having a section, termed the header, with data for communication control and a section, termed the payload, with digital voice data from part of the voice content, a voice packet without voice content having the header without the payload, at least one piece of time information of a transmitter time of a transmitter being contained in the voice packet, wherein the piece of time information indicates a time of sending of the voice packet (110, 120; 210) by the transmitter, wherein a sampling instant of a first sample when sampling the voice content is adopted as the time of sending of the voice packet, and the receiver waiting to process the voice content for a wait time, termed a buffer, after receiving a first voice packet with voice content, characterized in that, after the receipt of a first voice packet, termed the initial packet, during a connection period on a transmission channel of the voice packet, the receiver initializes a receiver clock using a transmitter time by means of the time information in the initial packet, so that the receiver time correlates with the transmitter time when sending out the voice packet, in that, after the receiver clock has been initialized, the receiver determines a minimum relative packet transmission duration for each receipt of subsequent voice packets by comparing the receiver time with the time information at the transmitter time when the voice packet was sent out, which is contained in the header of the subsequent voice packet, and determining a relative packet transmission duration relative to the receiver time, temporarily storing a resultant minimum relative packet transmission duration, and adjusting the receiver time dependent on the temporarily stored minimum relative packet transmission duration in such a manner that the receiver time correlates with the transmitter time when sending out the voice packet with the minimum relative packet transmission duration, in that, when receiving a first voice packet with voice content after at least one voice packet without voice content, the receiver determines the actual time of receipt of this voice packet by comparing the time information in the received voice packet with the receiver time at receipt and determines the buffer as a function of the actual time of receipt.

2. The method according to claim 1, characterized in that during the initialization of the receiver clock and during the determination of the relative packet transmission duration, a different length of voice packets with voice content and voice packets without voice content is taken into account.

3. The method according to claim 1, characterized in that the determination of the minimum packet transmission duration takes place at multiple intervals during the connection period.

4. The method according to claim 1, characterized in that the adjustment of the receiver time as a function of the temporarily stored minimum relative packet transmission duration takes place in such a manner that the receiver time is advanced by the minimum relative packet transmission duration, if this indicates that a voice packet with a shorter packet transmission time was received.

5. The method according to claim 1, characterized in that the adjustment of the receiver time as a function of the temporarily stored minimum relative packet transmission duration takes place in such a manner that the receiver time is set back if the temporarily stored minimum relative packet transmission duration indicates that only voice packets with a longer packet transmission duration were received, wherein the receiver time is set back by a defined or definable duration.

6. The method according to claim 1, characterized in that the determination of the minimum relative packet transmission duration takes place for voice packets without voice content and voice packets with voice content.

7. The method according to claim 1, characterized in that the buffer, starting from a maximum buffer, adjusts a maximum jitter to be taken into account on the basis of a delay to receipt resulting from the comparison of the time information in the first voice packet with voice content and the receiver time when this first voice packet is received.

8. The method according to claim 1, characterized in that the voice packet with identical voice content is received by the receiver via a plurality of different transmission channels, wherein a correction of the delay of the voice packets with identical voice content via the different transmission channels is applied by the receiver.

9. A receiver for receiving voice packets via internet protocol based networks and for processing voice content contained in the voice packets, having a receiving unit, which can be connected to the internet protocol based network and is set up for receiving voice packets transmitted via the internet protocol based network, and having an arithmetic logic unit with receiver clock, which is set up to process the received voice packets, characterized in that the arithmetic logic unit is set up to execute the method for jitter compensation according to claim 1, when receiving and processing the voice content.

10. The receiver according to claim 9, characterized in that the receiver is set up to receive the voice packet with the identical voice content via a plurality of different transmission channels and to apply the method according to claim 8 in the process, wherein the arithmetic logic unit is set up to process the voice content from the received voice packets with the identical voice content from a plurality of the various transmission channels.

11. A method for sending and receiving voice content, in which a transmitter converts voice content into a sequence of voice packets with or without voice content, a voice packet with voice content having a section, termed the header, with data for communication control and a section, termed the payload, with voice data digitized from part of the voice content and a voice packet without voice content having the header without the payload, and each voice packet, particularly the header of the voice packet, containing at least one piece of time information of a transmitter time, which indicates the time of sending of the voice packet, and sends out the sequence of the voice packets via at least one transmission channel of an internet protocol based network, and in which a receiver receives the sequence of voice packets with or without voice content and processes the voice content, characterized in that the method according to claim 1 is applied in the receiver.

12. The method according to claim 11, characterized in that a permanent communication connection is set up in the internet protocol based network for a connection period between the transmitter and the receiver via at least one communication channel, wherein, during the connection period, at times when no voice content should be transmitted, voice packets without voice content are exchanged to maintain the connection between the transmitter and receiver, and wherein, at times during the connection period when voice content should be transmitted, the sequence of voice packets with the voice content is transmitted from the transmitter to the receiver.

13. The method according to claim 11, characterized in that the transmitter sends out a voice packet via a plurality of different transmission channels and the receiver receives the voice packets sent out via various transmission channels.

14. The method according to one of claim 11, characterized in that the method is used in radio communication, particularly for the transmission of operational ground-to-air communication in CLIMAX operation, in which a plurality of different transmission channels are used for transmitting a radio message as voice content.

15. A device for sending and receiving voice packets via internet protocol based networks with voice content contained in the voice packets having a transmitter and a receiver, the transmitter having a voice recording unit for recording the voice content, and an arithmetic logic unit with transmitter clock, the arithmetic logic unit being set up for processing the voice content according to the method according to claim 11, and the receiver having a receiving unit, which can be connected to the internet protocol based network and is set up for receiving voice packets transmitted via the internet protocol based network, and having an arithmetic logic unit with receiver clock, which is set up to process the received voice packets, characterized in that the arithmetic logic unit is set up to execute the method for jitter compensation according to claim 1, when receiving and processing the voice content.

* * * * *